United States Patent
Bao et al.

(10) Patent No.: US 10,341,421 B2
(45) Date of Patent: Jul. 2, 2019

(54) ON-DEVICE SOCIAL GROUPING FOR AUTOMATED RESPONSES

(71) Applicant: Samsung Electronics Co., Ltd., Gyeonggi-Do (KR)

(72) Inventors: Xuan Bao, San Jose, CA (US); Jun Yang, Milpitas, CA (US); Zhixian Yan, Sunnyvale, CA (US); Lu Luo, Sunnyvale, CA (US); Evan Welbourne, Seattle, WA (US); Yifei Jiang, Santa Clara, CA (US)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 610 days.

(21) Appl. No.: 14/663,147

(22) Filed: Mar. 19, 2015

(65) Prior Publication Data

US 2015/0227611 A1    Aug. 13, 2015

Related U.S. Application Data

(63) Continuation-in-part of application No. 14/274,604, filed on May 9, 2014.

(60) Provisional application No. 61/822,272, filed on May 10, 2013, provisional application No. 61/861,311, filed on Aug. 1, 2013, provisional application No. 61/968,196, filed on Mar. 20, 2014.

(51) Int. Cl.

| | |
|---|---|
| *H04L 29/08* | (2006.01) |
| *G06F 16/35* | (2019.01) |
| *G06F 16/28* | (2019.01) |
| *G06F 17/11* | (2006.01) |
| *G06F 15/16* | (2006.01) |

(52) U.S. Cl.
CPC ............ *H04L 67/10* (2013.01); *G06F 16/285* (2019.01); *G06F 16/35* (2019.01); *G06F 17/11* (2013.01)

(58) Field of Classification Search
CPC ........ G06F 17/30705; G06F 17/30598; G06Q 50/01; H04L 67/10
USPC ......................................... 707/737
See application file for complete search history.

(56) References Cited

U.S. PATENT DOCUMENTS

| | | | |
|---|---|---|---|
| 6,219,653 B1 * | 4/2001 | O'Neill | ................. G06Q 10/08 705/29 |
| 6,665,423 B1 * | 12/2003 | Mehrotra | ............. H04N 19/543 375/E7.087 |
| 7,702,728 B2 | 4/2010 | Zaner et al. | |
| 8,019,692 B2 | 9/2011 | Rosen | |

(Continued)

OTHER PUBLICATIONS

Misra, A. et al., "Livelabs: initial reflections on building a large-scale mobile behavioral experimentation testbed," In ACM SIGMOBILE Mobile Computing and Communications Review, vol. 17, No. 4, pp. 47-59, Oct. 2013.

(Continued)

*Primary Examiner* — Usmaan Saeed
*Assistant Examiner* — Brian E. Weinrich
(74) *Attorney, Agent, or Firm* — Cuenot, Forsythe & Kim, LLC

(57) ABSTRACT

Social grouping using a device may include determining, by the device, a set of attributes associated with interactions between a user and a set of contacts, wherein the set of attributes associated with the interactions is related to the device. The contacts may be organized into groups. The groups may be hierarchically ordered with at least one of the groups being a subgroup of another one of the groups.

20 Claims, 15 Drawing Sheets

(56) References Cited

U.S. PATENT DOCUMENTS

| | | | |
|---|---|---|---|
| 8,041,595 B2* | 10/2011 | Robertson | G06Q 10/10 |
| | | | 705/7.19 |
| 8,135,777 B2 | 3/2012 | Colligan et al. | |
| 8,886,243 B1 | 11/2014 | Pabla et al. | |
| 2002/0115453 A1 | 8/2002 | Poulin et al. | |
| 2002/0120462 A1* | 8/2002 | Good | G06Q 10/10 |
| | | | 705/1.1 |
| 2003/0105826 A1* | 6/2003 | Mayraz | G06F 17/30867 |
| | | | 709/206 |
| 2003/0117485 A1* | 6/2003 | Mochizuki | G06T 13/40 |
| | | | 348/14.01 |
| 2003/0158855 A1* | 8/2003 | Farnham | G06F 3/0481 |
| | | | 707/999.102 |
| 2007/0156502 A1* | 7/2007 | Bigvand | G06Q 30/02 |
| | | | 705/26.1 |
| 2007/0168863 A1 | 7/2007 | Blattner et al. | |
| 2009/0313299 A1* | 12/2009 | Bonev | G06F 17/30554 |
| | | | 707/999.103 |
| 2010/0036912 A1 | 2/2010 | Rao | |
| 2010/0058196 A1* | 3/2010 | Krishnan | G06Q 10/10 |
| | | | 715/747 |
| 2010/0076968 A1 | 3/2010 | Boyns et al. | |
| 2011/0047511 A1* | 2/2011 | Essl | H04M 1/72552 |
| | | | 715/836 |
| 2011/0276689 A1 | 11/2011 | Rosen | |
| 2011/0319061 A1 | 12/2011 | Schmackkpfeffer et al. | |
| 2011/0320536 A1 | 12/2011 | Lobb et al. | |
| 2012/0197986 A1 | 8/2012 | Chen et al. | |
| 2012/0210334 A1* | 8/2012 | Sutedja | G06Q 10/107 |
| | | | 719/314 |
| 2012/0221441 A1 | 8/2012 | Patterson et al. | |
| 2012/0324042 A1 | 12/2012 | Graham et al. | |
| 2013/0122934 A1 | 5/2013 | Branch et al. | |
| 2013/0132865 A1 | 5/2013 | Li | |
| 2013/0212606 A1 | 8/2013 | Kannan et al. | |
| 2013/0232324 A1 | 9/2013 | Rubin et al. | |
| 2014/0025973 A1 | 1/2014 | Schillings et al. | |
| 2014/0032259 A1 | 1/2014 | Lafever et al. | |
| 2014/0337340 A1 | 11/2014 | Yang et al. | |

OTHER PUBLICATIONS

Lane, N.D. et al., "Exploiting social networks for large-scale human behavior modeling," In IEEE Pervasive Computing, vol. 10, No. 4, pp. 45-53, 2011.

Min, J.K. et al., "Mining smartphone data to classify life-facets of social relationships," In Proc. of ACM 16th Conf. on Computer Supported Cooperative Work, pp. 285-294. 2013.

Wiese, J. et al., "Challenges and opportunities in data mining contact lists for inferring relationships," In Proc. of 2014 ACM Int'l. Joint Conf. on Pervasive and Ubiquitous Computing, ACM UbiComp '14, pp. 643-647, Sep. 2014.

Aharony, N. et al., "Social fMRI, Investigating and Shaping Social Mechanism in the Real World," In Pervasive and Mobile Computing, vol. 7, pp. 643-659, 2011.

Yu, Z. et al., "Understanding social relationship evolution by using real-world sensing data," "Understanding social relationship evolution by using real-world sensing data." World Wide Web vol. 16, Issue No. 5-6, pp. 749-762, 2013.

Tang, L. et al., "Community detection and mining in social media," Synthesis Lectures on Data Mining and Knowledge Discovery 2, No. 1, pp. 1-137, 2010.

Barbieri, N. et al., "Cascade-based community detection," In Proc. of Sixth ACM Int'l. Conf. on Web Search and Data Mining (WSDM '13), pp. 33-42, 2013.

"Evolution of social networks," Doreian, P. et al. Eds., Gordon and Breach Publishers, 19 p. 2013.

Saravanan, M. et al., "Analyzing and labeling telecom communities using structural properties," Social Network Analysis and Mining, vol. 1, No. 4, pp. 271-286, 2011.

Fortunato, S., "Community detection in graphs," In Physics Reports, vol. 486, No. 3, pp. 75-174, 2010.

Do, T.M.T. et al., "Groupus: Smartphone proximity data and human interaction type mining," In 15th Annual IEEE Int'l. Symposium on Wearable Computers, (ISWC), pp. 21-28, 2011.

Zheng, J. et al., "An unsupervised learning approach to social circles detection in ego bluetooth proximity network," In Proc.of 2013 ACM Int'l. Joint Conf. on Pervasive and Ubiquitous Computing, (UbiComp '13) pp. 721-724, 2013.

Lee, Y. et al., "Sociophone: Everyday face-to-face interaction monitoring platform using multi-phone sensor fusion," In Proc. of 11th Annual Int'l Conf. on Mobile Systems, Applications and Services, ACM, pp. 375-388, 2013.

Cho, E. et al., "Friendship and mobility: user movement in location-based social networks," In Proc. of 17th ACM SIGKDD Int'l Conf. on Knowledge Discovery and Data Mining, ACM, pp. 1082-1090, 2011.

Seshadri, M. et al., "Mobile call graphs: beyond power-law and lognormal distributions," In Proc. of 14th ACM SIGKDD Int'l Conf. on Knowledge Discovery and Data Mining, ACM, pp. 596-604, 2008.

MacLean, D. et al., "Groups without tears: mining social topologies from email," In Proc. of 16th Int'l. Conf. on Intelligent User Interfaces, ACM, pp. 83-92, 2011.

"Tizen, The OS of Everything," [online] Tizen Project, a Linux Foundation Project, Copyright 2012, retrieved Mar. 17, 2015, retrieved from the Internet: <https://www.tizen.org/>, 5 pg.

"Whatsapp," [online] WhatsApp, Inc. Copyright 2015, retrieved Mar. 17, 2015, retrieved from the Internet: <https://www.whatsapp.com/>, 2 pg.

"Wechat," [online] Tencent, Inc. Copyright 2011-2014, retrieved Mar. 17, 2015, retrieved from the Internet: <http://www.wechat.com/en/>, 2 pg.

Baden, R. et al., "Persona: An Online Social Network with User-Defined Privacy," In ACM SIGCOMM Computer Communication Review, vol. 39, No. 4, Aug. 16, 2009, pp. 135-146.

Barabasi, A.L. et al., "Evolution of the Social Network of Scientific Collaborations", Physica A: Statistical Mechanics and Its Applications, vol. 311, No. 3, Aug. 15, 2002, pp. 590-614.

Cooley, C.H., "Human Nature and the Social Order," Charles Scribner's Sons, New York, pp. 1-44, 1902.

Cooley, C.H., "Social Organization: A Study of the Larger Mind," Charles Scribner's Sons, New York, pp. 23-31, 1929.

Culotta, A. et al., "Extracting Social Networks and Contact Information from Email and the Web", In Proc. of First Conf. on Email and Anti-Spam (CEAS), Jul. 2004.

Eagle, N. et al.,"Reality Mining: Sensing Complex Social Systems" In Personal and Ubiquitous Computing, vol. 10, No. 4, pp. 255-268, May 1, 2006.

Ebel, H. et al., "Dynamics of Social Networks," in Complexity, vol. 8, No. 2, pp. 24-27, 2002.

"Hire Freelancers and Find Freelance Jobs Instantly," Previously Elance, Upwork Global Inc. © 2015-2016, [retrieved Mar. 8, 2013] retrieved from the Internet: <https://web.archive.org/web/20130508140730/https://www.elance.com>, 3 pg.

Gilbert, E. et al., "Predicting Tie Strength With Social Media," In Proc. of SIGCHI Conf. on Human Factors in Computing Systems. ACM, Apr. 4, 2009, pp. 211-220.

Gong, N.Z. et al., "Evolution of Social-attribute Networks: Measurements, Modeling, and Implications Using Google+," In Proc.of 2012 ACM Conf. on Internet Measurement, Nov. 14, 2012, pp. 131-144.

Google, Inc., "Funf-Open-Sensing-Framework—Android-Based Framework for Phone-Based Sensing and Data Collection," [online] retrieved Jun. 28, 2016, retrieved from the Internet: <https://web.archive.org/web/20141224060042/https://code.google.com/p/funf-open-sensing-frameworld>, 2 pg.

Google, Inc., "Contacts Plus," [online] Mar. 14, 2015 [retrieved Jun. 28, 2016] retrieved from the Internet: <https://web.archive.org/web/20150315083700/https://play.google.com/store/apps/details?id=com.contapps.android&hl=en>, 3 pg.

(56) References Cited

OTHER PUBLICATIONS

Google, Inc., "GangBook—Group Contact Manager," [online] GooglePlay © 2016 [retrieved Jun. 28, 2016] retrieved from the Internet: <https://play.google.com/store/apps/details?id=com.guardroid.m.gb>, 3 pg.

Google, Inc., "GO Contact Widget," [online] GooglePlay © 2016 [retrieved Jun. 28, 2016] retrieved from the Internet: <https://play.google.com/store/apps/details?id=com.gau.go.launcherex.gowidget.contactwidget&hl=en>, 4 PG.

Google, Inc., "GROUPY / Contact by Group," [online] GooglePlay © 2016 [retrieved Jun. 28, 2016] retrieved from the Internet: <https://play.google.com/store/apps/details?id=com.kigate.groupy&hl=en>, 4 pg.

Granovetter, M., "The Strength of Weak Ties: A Network Theory Revisited," Sociological Theory, vol. 1, pp. 201-233, 1983.

Huang, Z. et al., "Exploring Emergent Semantic Communities from DBLP Bibliographic Database," Int'l Conf. on Advances in Social Network Analysis and Mining (ASONAM '09) pp. 219-224, Jul. 2009.

Li, K. et al., "Exploring social interactions and attributes of casual multiplayer mobile gaming," In Proc. of 4th Int'l. Conf. on Mobile Technology, Applications, and Systems and the 1st Int'. Sym. on Computer Human Interaction in Mobile Technology (pp. 696-703). ACM, Sep. 2007.

MIT Human Dynamics Lab, "Reality Commons: Friends and Family Dataset," Nov. 22, 2012, [retrieved Mar. 13, 2015], retrieved from the Internet: <https://web.archive.org/web/20121123072127/http://realitycommons.media.mit.edu/friendsdataset.html>, 1 pg.

Palla, G. et al., "Quantifying social group evolution," Nature, vol. 446, No. 7136, pp. 664-667, Apr. 5, 2007.

Raento, M. et al., "Smartphones: An Emerging Tool for Social Scientists," Sociological Methods Research, vol. 37, vol. 3, pp. 426-454, Feb. 2009.

Salvador, S. et al., "Determining the number of clusters/segments in hierarchical clustering/segmentation algorithms," In 16th IEEE Int'l. Conf. on Tools with Artificial Intelligence, ICTAI 2004, pp. 576-584, Nov. 2004.

Sun, D. et al., "Social relationship classification based on interaction data from smartphones," In IEEE Int'l. Conf. on Pervasive Computing and Communications Workshops (PERCOM Workshops), Mar. 18, 2013, pp. 205-210.

Wang, X., et al., "Discovering overlapping groups in social media," In IEEE 10th Int'l. Conf. on Data Mining (ICDM), pp. 569-578, Dec. 13, 2010.

U.S. Appl. No. 14/274,604, Non-Final Office Action, dated Jun. 28, 2016, 14 pg.

U.S. Appl. No. 14/274,604, Final Office Action, dated Jan. 12, 2016, 15 pg.

\* cited by examiner

ON-DEVICE SOCIAL GROUPING FOR AUTOMATED RESPONSES

CROSS-REFERENCE TO RELATED APPLICATIONS

This application is a Continuation-In-Part of U.S. patent application Ser. No. 14/274,604, filed May 9, 2014, entitled "Methods and Systems for On-Device Social Grouping," which claims priority to U.S. Provisional Patent Application Ser. No. 61/822,272, filed May 10, 2013, entitled "Smart-Group: Social Grouping via Multimodal Mobile Phone Interactions," and U.S. Provisional Patent Application Ser. No. 61/861,311, filed Aug. 1, 2013, entitled "SmartCircle: On-device Social Grouping via Multimodal Mobile Interaction Analysis." This application further claims the benefit of U.S. Provisional Patent Application Ser. No. 61/968,196, filed on Mar. 20, 2014, entitled "Managing the Forever Growing Contact list: Automatically Identifying Social Relationships with Phone Contacts via Mining Mobile Communication Data." Each of the foregoing Patent Applications is incorporated herein by reference in its entirety.

TECHNICAL FIELD

This disclosure relates to the field of social grouping and, more particularly, to user-centric social grouping.

BACKGROUND

Grouping of social connections to form social networks has become useful in many contexts. Better understanding of a user's social connections can provide better insight into the user. Such insight can facilitate the placement of the user into optimal social networks so that the user can enjoy association with similar social connections. Such insight can also provide a competitive edge for existing and emerging businesses that depend on their ability to tailor goods and services to the particular needs of the user. As a result, it is important to understand the social connections among individuals, both in the real world and in cyberspace.

Conventional approaches in the grouping of social connections are associated with certain limitations. Some conventional techniques take a global view of social connections among a user's contacts, which can cause low grouping accuracy. In this regard, a connection between a user and the particular contacts of the user may be overshadowed by the relationship between the user and all of his or her contacts in the entire social network. In addition, other conventional techniques may raise privacy concerns as a user's social connections are identified by analyzing data stored in a system controlled by others. User data uploaded to such a system exposes personal information of the user to a higher risk of privacy violations and data breach.

SUMMARY

A method includes determining, by a device, a set of attributes associated with interactions between a user and a set of contacts. The set of attributes is associated with the interactions related to the device. The method may also include organizing the contacts into a plurality of groups. The plurality of groups may be hierarchically ordered with at least one group of the plurality of groups being a subgroup of another group of the plurality of groups.

A system includes a processor programmed to initiate executable operations. The executable operations may include determining a set of attributes associated with interactions between a user and a set of contacts. The set of attributes is associated with the interactions related to the device. The executable operations may also include organizing the contacts into a plurality of groups. The plurality of groups may be hierarchically ordered with at least one group of the plurality of groups being a subgroup of another group of the plurality of groups.

A computer program product includes a computer readable storage medium having program code stored thereon. The program code is executable by a processor to perform a method. The method includes determining a set of attributes associated with interactions between a user and a set of contacts. The set of attributes is associated with the interactions related to the device. The method may also include organizing the contacts into a plurality of groups. The plurality of groups may be hierarchically ordered with at least one group of the plurality of groups being a subgroup of another group of the plurality of groups.

This Summary section is provided merely to introduce certain concepts and not to identify any key or essential features of the claimed subject matter. Many other features and embodiments of the invention will be apparent from the accompanying drawings and from the following detailed description.

Figure 1:
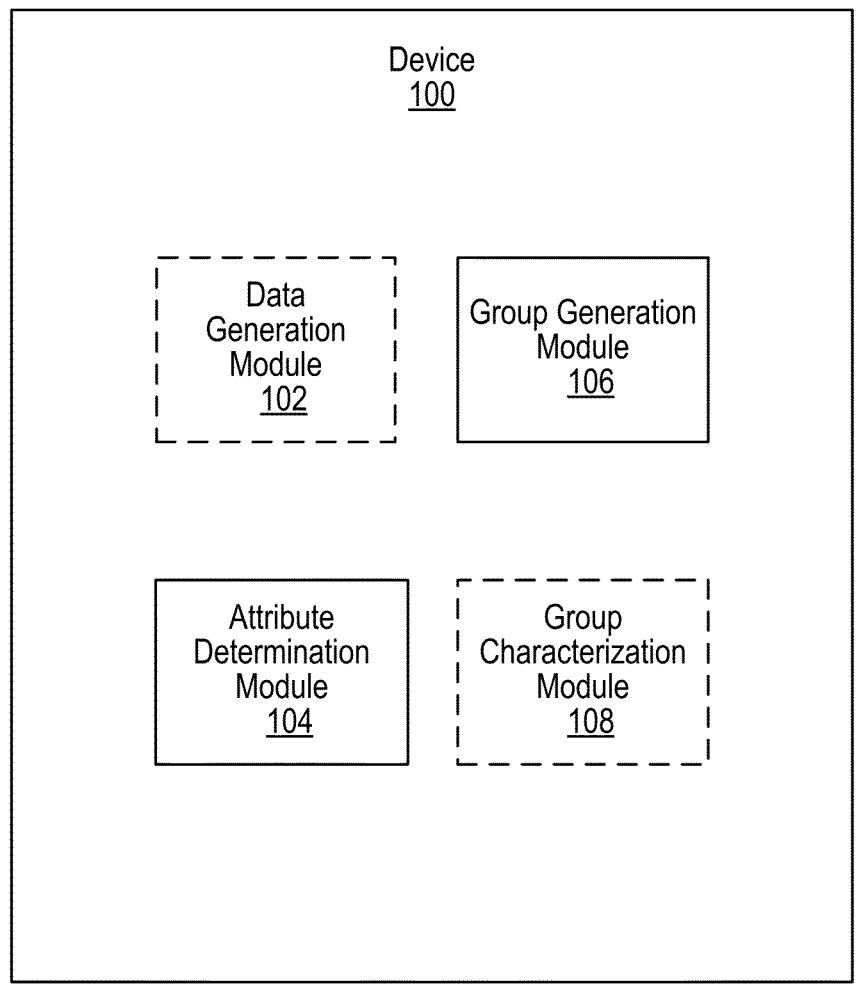
FIG. 1 illustrates an example device configured to organize a user's contacts in a user-centric manner according to an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

A user's contacts or social connections may be organized based on usage of mobile devices by users. A user's contacts or social connections, as described herein, may include individuals that the user interacts with in the real world or in the cyberspace via one or more communication modalities. Communication modalities may include, for example, calls (e.g., voice calls, video calls), text messaging (e.g., Short Message Service (SMS), Instant Messenger (IM) service, etc.), physical encounters, or applications (e.g., emails, social networks, games, web browsers, etc.)

A user may interact with contacts from different social groups differently. For example, professionals may make phone calls with business connections during work hours. As another example, friends and families may communicate during non-business hours. As yet another example, acquaintances may exchange emails on intermittent occasions. Various types of interactions between a user and a user's contact may reflect certain traits about the user's contacts. Accordingly, information describing interactions between a user and a user's contacts may be analyzed to organize the user's contacts. Various embodiments of the present disclosure organize a user's contacts or social connections by analyzing interaction data reflecting the user's interactions with his or her contacts or social connections on a mobile device or many mobile devices of the user. Interaction data may include, for example, information associated with phone calls, SMS communications, Bluetooth proximity, GPS co-locations, emails, and social network activities.

Interaction data associated with interactions between a user and the user's contacts may be obtained from various records. Social activities may leave footprints on the mobile device in various forms, such as call logs, SMS histories, emails, web browsing histories, and social network activities using mobile apps (e.g., Facebook®, Twitter®, etc.). In addition, physical sensors may also collect information regarding a user's social activities, such as physical encounters. For example, Bluetooth or NFC on mobile devices may be used to collect information on the physical proximity between a user and the user's contacts, and GPS or Wi-Fi may be used to detect a user's location and co-location with others. The organization of a user's contacts may be based on such records collected from one or more mobile devices of the user.

One or more attributes associated with interactions between a user and his or her contacts may be determined. In some embodiments, the attributes may include, for example, frequencies of interactions, durations of interactions between a user and the user's contacts across different communication modalities, and other information as described in more detail herein. Attributes of the interaction data may be represented by feature vectors with various dimensions. Various embodiments of the present disclosure extract features from interaction data to capture spatial-temporal relationships of the interaction data. The feature vectors may be projected in an n-dimensional space to facilitate the organization of contacts and the identification of an optimal number of groups.

Contacts may be organized into groups based on the attributes associated with interactions between a user and the user's contacts. Each group may comprise one or more of a user's contacts. Various embodiments of the present disclosure may perform multimodal clustering to partition a user's interactions with different contacts and thereby organize the contacts. The multimodal clustering may include various techniques, which are described in more detail herein. The clustering technique may be hierarchical and may be related to attribute determination. Subsequent to organizing a user's contacts into groups, each group may be associated with certain characteristics unique to the group.

FIG. 1 illustrates an example device 100 configured to organize a user's contacts in a user-centric manner according to an embodiment of the present disclosure. The device 100 may be mobile or non-mobile. The device 100 may be, for example, a smartphone (e.g., GALAXY NOTE®), a game console (XBOX®), a computer (e.g., a personal computer), a tablet (e.g., GALAXY TAB®), and/or a wearable device (e.g., a smartwatch (e.g., GALAXY GEAR™), an activity tracker (e.g., GALAXY GEAR™ FIT). As shown in FIG. 1, the example device 100 may comprise an attribute determination module 104 and a group generation module 106. The example device 100 may further optionally comprise a data generation module 102 or a group characterization module 108.

A user may interact with the user's contacts by using the device 100. The user's contacts may include individuals that the user interacts via different communication modalities. The user may interact with a contact via, for example, calls (e.g., voice calls, video calls), text messaging (e.g., Short Message Service (SMS), Instant Messenger (IM) service, etc.), physical encounters (e.g., Bluetooth connection, Wi-Fi connection, NFC connection, GPS, etc.), or applications (e.g. email, social networks, games, web browser, etc.). The user may communicate with his or her contacts by voice calling, video calling, text messaging, connecting by Bluetooth, emailing, playing a game, or using a social network (e.g., checking a contact's status updates, chatting in a social network, shaking phones together at the same time, etc.)

The data generation module 102 may be configured to generate interaction data. The interaction data is related to interactions between a user and the user's contacts. The data generation module 102 may collect and parse communication records related to different communication modalities. The interaction data may include various types of information, such as a time point when a call starts, a time point when a call ends, a time point when a user sends a message, a time point when a user receives a message, a phone number of a contact, a chat ID of a contact, etc. The data generation module 102 may generate the interaction data based on a unique contact ID associated with a contact. A contact can be represented by multiple IDs across different communication modalities, which may cause difficulties or errors in organizing contacts. To address these difficulties, the data generation module 102 may generate interaction data such that a contact corresponds to the unique contact ID and may arrange the interaction data of a user with a contact based on the contact ID.

The attribute determination module 104 may be configured to determine one or more attributes associated with interactions between a user and his or her contacts. The interactions between the user and the contacts are based on use of the device 100 by the user. The attribute determination module 104 may be configured to capture the spatial-temporal relationships of the interactions. In some embodiments, the attributes may include, for example, frequencies of interactions and durations of interactions, between a user and the user's contacts, across different communication modalities. In some embodiments, the attributes may include, for example, a user's location when interacting with the user's contact. Attributes may further include, for example, a user's tone, pitch, or volume when interacting with the user's contact, metadata of interactions, burst frequencies of interactions, or durations of the burst.

The group generation module 106 may be configured to organize a user's contacts into groups based on the attributes. To organize a user's contacts, the group generation module 106 may perform multimodal clustering. Multimodal clustering, as used herein, may involve spatial and temporal clustering, feature-level fusion, or optimal-K clustering. Other suitable techniques also may be used. The multimodal clustering may be performed based on the attributes determined by the attribute determination module 104. The group generation module 106 may be configured to determine the optimal partitioning of the contacts into the optimal number of groups. In some embodiments, the group generation module 106 may be configured to dynamically identify a significant partition of the attributes (e.g., significant locations, significant time windows, etc.) determined by the attribute determination module 104. The significant partition of the attributes reveals a user's behavior pattern, which may be used as a feature to organize contacts. In various embodiments, a significant location or a significant time may be identified by spatial clustering or temporal clustering, respectively.

The group characterization module 108 is configured to characterize each contact group. A group of contacts may be associated with certain characteristics, such as a group size or a group significance ranking in terms of closeness. The group characterization module 108 may be configured to detect the ground truth of a user's social groups. The ground truth of a user's social groups may be determined based on a user's labeling of the user's contacts. The ground truth of a user's social groups may provide a basis for characterizing a group of contacts. Groups determined by the group characterization module 108 may be compared to the ground truth by using grouping metrics (e.g., purity metric). The group characterization module 108 may be further configured to monitor group evolution over time. Because a user's contacts and a user's interactions with a contact may change, initial organization of contacts may warrant updating to reflect changes in the original groups, the formation of any new group, or the termination of any original group.

Figure 2:
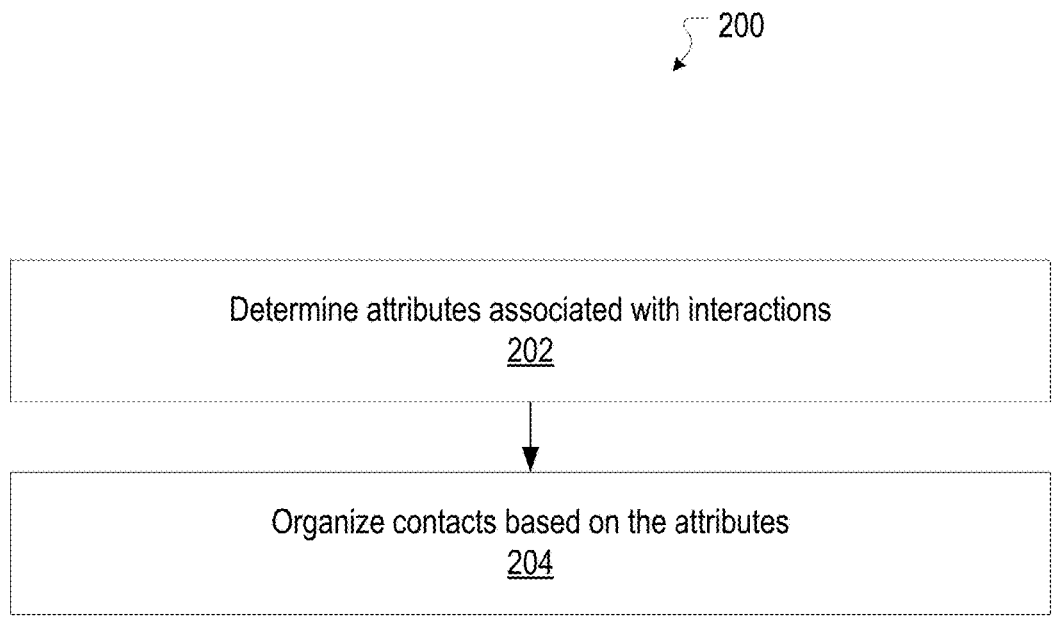
FIG. 2 illustrates an example flowchart of a method for organizing contacts in a user-centric manner according to an embodiment of the present disclosure.

FIG. 2 illustrates an example flowchart of a method 200 for organizing contacts in a user-centric manner according to an embodiment of the present disclosure. At block 202, attributes associated with interactions between a user and his or her contacts are determined. The interactions may be based on a device that the user uses to interact with the contacts. The interactions may also be based on multiple devices that the user uses to interact with the contacts. Based on the attributes, the interaction data associated with interactions between a user and his or her contacts may be projected into different spaces and reveal different patterns. In this regard, attributes of the interaction data may be represented by feature vectors with various dimensions. The feature vectors may be projected in an n-dimensional space to facilitate the organization of contacts and the identification of the optimal number of groups, as discussed in more detail herein.

At block 204, the contacts are organized into groups based on the attributes determined at block 202. Each group may comprise one or more of a user's contacts. In some embodiments, the contacts may be organized by performing multimodal clustering based on the attributes determined at block 204, thereby partitioning a user's interactions with different contacts. The multimodal clustering may include spatial and temporal clustering, feature-level fusion, and/or optimal-K clustering. The clustering technique may be hierarchical and may be related to attribute determination. For example, the spatial and temporal clustering may find a significant time window or a significant location in attribute determination. The spatial clustering may partition interactions into several groups according to geo-locations. For instance, for a teacher, significant locations may be partitioned to include the person's home, office, gym, and other locations. However, for a long-distance truck driver, significant locations may be partitioned to include frequently stayed places. The temporal clustering relates to the time domain and identifies partitions of interactions based on different time windows. For instance, for an engineer, significant time windows may be partitioned to include business hours on weekdays, off-business hours on weekdays, and weekends.

Other types of multimodal clustering techniques may also be used. The feature level fusion constructs a global feature vector integrated with time and location, which reflects attributes of interactions between a user and a user's contacts based on various communication modalities. In various embodiments, the global feature vector may be based on single-modal feature vectors. Each single-modal feature vector represents features for a particular communication modality. The optimal-K clustering may be applied to organize the user's contacts into groups based on a determination of an optimal group number to organize the user's contacts.

Figure 3A:
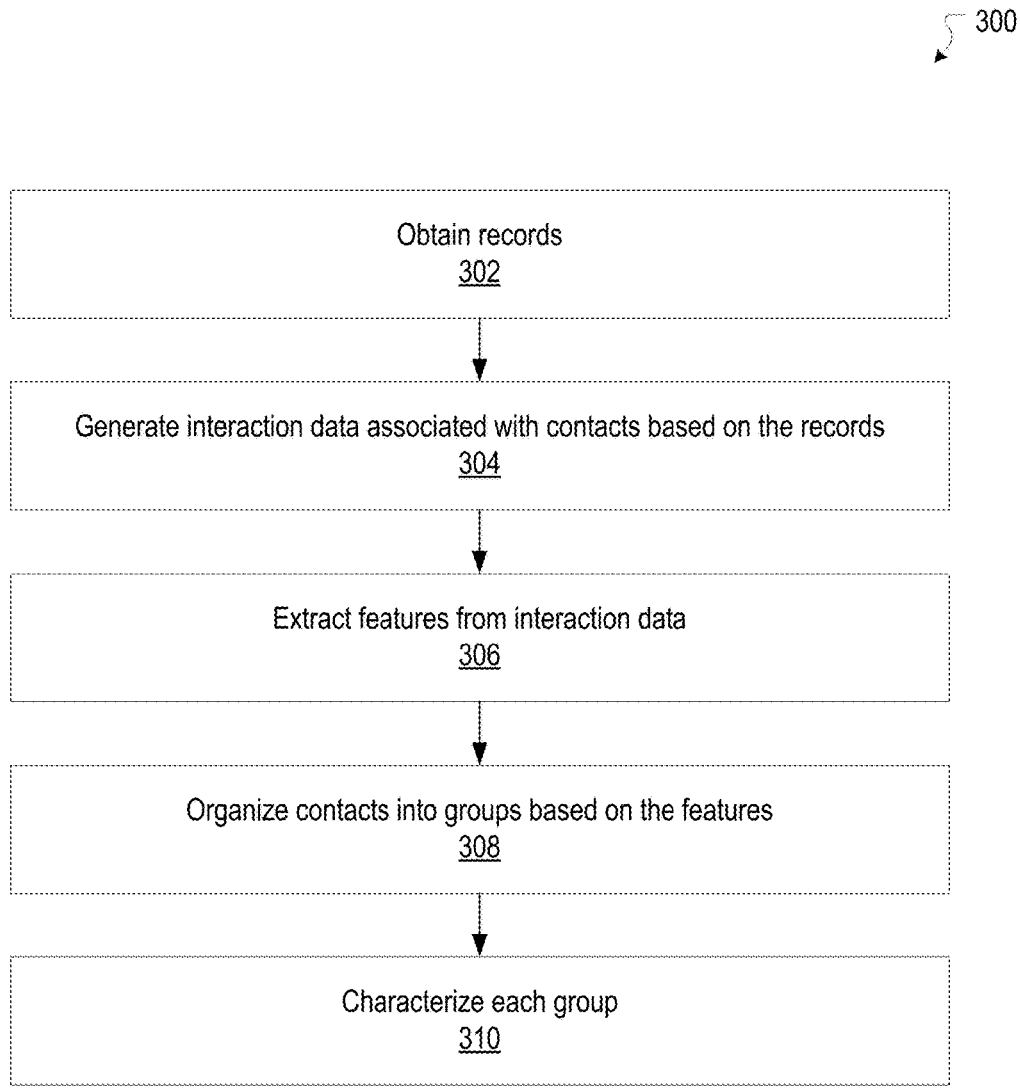
FIG. 3A illustrates an example flowchart of a method for organizing contacts in a user-centric manner according to an embodiment of the present disclosure.

FIG. 3A illustrates an example flowchart of a method 300 for organizing contacts in a user-centric manner according to an embodiment of the present disclosure. At block 302, records related to interactions between a user and the user's contacts are obtained. Interactions between a user and the user's contacts may be logged in various records, such as call logs, SMS logs, location traces, Bluetooth proximity logs, social network history, etc. In some embodiments, records may be obtained from one or more record sources. A user may use multiple devices to interact with the user's contacts. For instance, a user may interact with the user's contacts using a smart phone at work during the day and a tablet at home at night. Records may be obtained from both the smart phone and the tablet. Records from different record sources associated with different mobile devices may be processed and analyzed together to organize the contacts of the user.

At block 304, interaction data is determined based on the records obtained at block 302. In various embodiments, raw data in the records may be converted into interaction data, that is associated with the interactions between the user and the user's contacts. For example, raw data of call logs, SMS logs, Bluetooth logs, social network histories may be converted into interaction data. The interaction data may be sorted and stored according to the particular communication modality associated with particular interaction data. For example, the interaction data related to interactions based on calls may be stored in one data table and the interaction data related to interactions based on SMS may be stored in another data table.

Interaction data may be related to all interactions between a user and a contact. Interactions between the user and the contact may be recorded in various logs, and the contact may have different IDs in various records. For example, a contact may be represented by his or her name in a call log, by his or her device ID in a Bluetooth log, and by his or her screen name in a chat application. A contact ID may be created to represent a contact and stored in a reference table. The contact ID may be unique for each contact. The reference table may further map the contact ID of a contact with the other IDs associated with the contact in various records. Data in different records that correspond to the same contact may be linked by the contact ID. As such, interaction data related to interactions between a user and a contact may be created from all the raw data related to the contact in different records. Accordingly, interaction data may reflect all the interactions between a user and the contact and may be used to characterize interactions between a contact and the user.

Subsequently, at block 306, features may be extracted from the interaction data determined at block 304. In various embodiments, attributes associated with interactions (e.g., determined at block 202) comprise specific features that provide detailed or granular information about attributes. Features may be defined or selected such that the spatial-temporal relationships of interaction data may be captured and optimal partitions of a user's contacts may be determined. In some embodiments, features may reflect specific information relating to, for example, a frequency, a duration, a location, or a property of an interaction. Features may further reflect specific information relating to, for example, metadata, pitch, tone, or volume of a user's voice, physical proximity between a contact and a user, data burst, data size, application name, domain name, phone number, the number of communication modalities a user uses to interact with a contact, etc. Features may be represented as dimensions of information of a feature vector, as described in more detail herein.

Features may facilitate organization of contacts and may be extracted for all contacts of a user. Contacts with whom a user interacts similarly may be grouped together based on features. For example, a significant location or a significant time window may be identified as features and used to organize contacts. Contacts with whom a user interacts at a significant location or during a significant time window may need to be grouped together. For example, contacts with whom a user interacts at work or during business hours may be business connections.

Features may relate to frequencies of interactions. Frequencies for all interactions based on various communication modalities may be extracted. In various embodiments, frequencies of interactions may relate to calls (e.g., voice calls, video calls, etc.), SMS messages, physical encounters (e.g., Bluetooth, Wi-Fi, NFC, GPS, etc.), or applications (e.g., emails, social networks, games, web browser, etc.). In some embodiments, a location specific frequency may be extracted. The location specific frequency captures the spatial information in interactions between a user and the user's contacts at a location. Significant locations (e.g., home, work, frequently visited places such as coffee shops, grocery stores, schools, etc.) may be identified for a user. At each significant location, the frequency of interactions based on one or more communication modalities between the user and a contact may be determined. At a significant location, contacts with whom a user interacts may be grouped together. At a significant location, the more (or less) frequently a user interacts with a contact, the more (or less) likely the contact belongs to a group. For example, contacts that a user interacts with at the user's office may be grouped together. The more frequently a user interacts with a contact at the user's office, the more likely that contact should be grouped as the user's business connection.

In some embodiments, a feature of a time specific frequency is extracted. Significant time windows (e.g., regular business hours, non-business hours, weekdays, weekends, etc.) may be identified for a user. A significant time window may be predetermined, such as weekdays and weekends. The significant time windows may also be identified from the user's calendar. For example, a significant time window may be determined based on a recurrent meeting calendar entry on a user's calendar. In a significant time window, contacts with whom a user interacts may be grouped together. For example, contacts with whom a user interacts during business hours may be grouped together. In each significant time window, the frequency of interactions based on one or more communication modalities between the user and a contact may be determined. In a significant time window, the more (or less) frequently a user interacts with a contact, the more (or less) likely the contact belongs to a group. For example, the more frequently a user interacts with a contact during business hours, the more likely that contact should be grouped as the user's business connection.

In some embodiments, a feature of a property specific frequency is extracted. Properties such as incoming, outgoing, accepted, rejected, ignored, missed, may be determined. The property specific frequency may reveal information of the relationship between a contact and the user. For a property, contacts with whom a user interacts with may be grouped together. For instance, contacts whose interactions with the user are ignored may be grouped together. For each property, the frequency of interactions, based on one or more communication modalities, may be determined. For a property, the more (or less) frequently a user interacts with a contact, the more (or less) likely the contact belongs to a group. For example, the more frequently a user rejects calls from a contact, the more likely the contact should be grouped as a stranger.

Features may relate to durations of interactions. Durations for all interactions based on various communication modalities may be extracted. For example, durations of interactions may relate to calls (voice calls, or video calls), SMS messages, physical encounters (Bluetooth, Wi-Fi, NFC, GPS, etc.), or applications (e.g., emails, social networks, games, web browsers, etc.). In some embodiments, a location specific duration may be extracted. Significant locations (e.g., home, work, frequently visited places such as coffee shops, grocery stores, schools, etc.) may be identified for a user. Contacts with whom a user interacts at a location may be grouped together. At each significant location, the duration of interactions, based on one or more communication modalities, may be determined. In one embodiment, the average duration of interactions, based on various communication modalities, between a user and a contact, may be determined. At a significant location, the longer (or shorter) a user interacts with a contact, the more (or less) likely the contact belongs to a group. For example, the longer a user interacts with a contact in the office, the more likely the contact should be grouped as a business connection.

In some embodiments, a time specific duration is extracted. Significant time windows (e.g., regular business hours, non-business hours, weekdays, weekends, etc.) may be identified for a user. A significant time window may be predetermined. A significant time window may be identified from a user's calendar. In a time window, contacts with whom a user interacts may be grouped together. In each significant time window, the duration of interactions, based on one or more communication modalities, may be determined. In one embodiment, the average duration of interactions, based on various communication modalities, between a user and a contact, may be determined. In a significant time window, the longer (or shorter) a user interacts with a contact, the more (or less) likely the contact belongs to a group. For example, the longer a user interacts with a contact at night, the more likely the contact should be grouped as a family member.

In some embodiments, a property specific duration is extracted. Properties such as incoming, outgoing, accepted, rejected, ignored, missed, may be determined. For a property, contacts with whom a user interacts with may be grouped together. For instance, contacts whose interactions with the user are ignored may be grouped together. For each property, the duration of interactions, based on one or more communication modalities, may be determined. In one embodiment, the average duration of interactions, based on various communication modalities, between a user and a contact, may be determined. For a property, the longer (or shorter) a user interacts with a contact, the more (or less) likely the contact belongs to a group. For example, after accepting a call, the longer a user talks to a contact, the more likely the contact should be grouped as a family member. Features may further relate to, for example, metadata (i.e., the data that provides information about one or more aspects of an interaction, such as the date of creation), pitch, tone, or volume of a user's voice, physical proximity between a contact and a user, data burst (i.e., high-bandwidth transmission over a short period of time, such as a dialogue via SMS messages), data size, application name (i.e., the name of an application, such as Pinterest®), domain name, phone number, or the number of communication modalities a user uses to interact with a contact, etc. Such features may be extracted. The features may be used to group contacts. For example, when a user shares a picture or a web link with a contact via SMS messages, it may be more likely that the contact should be grouped as a friend. When the burst rate of SMS messages between a user and a contact is low, it may be more likely that the contact should be grouped as an acquaintance. When a user interacts with a contact only on a mobile site or a mobile application, it may be more likely the contact should be grouped as an acquaintance.

Extracted features may be represented by one or more single-modal feature vectors. A single-modal feature vector may correspond to a communication modality and may include multiple dimensions of information that reflect multiple features. Different feature vectors may be of different dimensions. For example, the single-modal feature vector $F_{call}$ reflects features related to calls, such as frequencies, durations, types, and locations; the single modal feature vector $F_{sms}$ reflects features related to SMS messages, such as frequencies, sizes (e.g., character count), burst frequencies, and locations; and the single-modal feature vector $F_{proximity}$ reflects features related to Bluetooth, such as frequencies, durations, and locations. For a contact, one or more single-modal feature vector may be formed.

Some features may be extracted by performing multimodal clustering such as spatial and temporal clustering. For example, a significant location or a significant time may be identified by performing spatial and temporal clustering. A significant location may be identified by clustering a user's geo-location data (e.g., GPS locations) over a period of time. Interaction data may be clustered into different groups based on geographical locations. A significant location may be identified by clustering multiple users' geo-location data (e.g., GPS locations) over a period of time. For example, a company may be identified when thousands of users' GPS locations are clustered. Interaction data may be clustered into groups by using GPS locations of one or more users gathered over a period of time.

Interaction data may also be clustered into groups based on time. In some embodiments, interaction data over a period of time may be clustered based on different times. A significant time or time periods may be predetermined (e.g., weekdays, weekends, holidays, mornings, afternoons, evenings, nights, etc.). In some embodiments, interaction data of a user over weekdays and weekends is clustered separately. A significant time or time periods may be determined by clustering a user's interaction data (e.g., calendar, calendar entries, a total number of interactions, etc.) over a period of time. Cutting time points may be identified and used to cluster interaction data. The cutting time points partition the user's interaction data into multiple clusters, and the distribution of the interaction data may be equal or almost equal among all clusters in some embodiments. In one embodiment, the distribution of interaction data based on the cutting points may be fitted into a Gaussian model.

At block 308, a user's contacts may be organized into groups based on the features extracted at block 306. Various embodiments organize a user's contacts based on multimodal attributes of social connections. Multimodal clustering based on the features generated at block 306 may be performed to partition a user's interactions with different contacts into different groups. The multimodal clustering may include feature-level fusion. The feature-level fusion constructs a global feature vector representing multimodal attributes of social connections.

A global feature vector may be created by combining single-modal feature vectors. The global feature vector may be further integrated with time and location. For example, a global feature vector $F=[F_{call}, F_{sms}, F_{proximity}]$ may be constructed from single modal feature vectors $F_{call}, F_{sms},$ and $F_{proximity}$, corresponding to call communication modality, SMS communication modality, and physical encounter communication modality, respectively. Each single-modal feature vector may comprise different features and be of various dimensions. Because a global feature vector is constructed from single-modal feature vectors, all the features of the single-modal feature vectors are included in the global feature vector. In some embodiments, in order to avoid model overfitting, a global feature vector may be normalized by providing uniform weights to each feature included in the global feature vector. A feature corresponds to a dimension of information and may reflect a type of information about the interaction. In further embodiments, feature selection may be applied to distinguish and enhance the discriminative power of each individual feature.

Contacts may be organized into a varying number of groups based on the global feature vector, and different levels of clustering may be performed. Multimodal clustering such as optimal-K clustering may be performed to identity the number of groups into which contacts may be organized. In some embodiments, K-means clustering may be applied hierarchically to find an optimal group number thereby enhancing the organization of contacts. The optimal clustering number (i.e., the K value in K-means) for organizing a user's contacts may be automatically derived based on the features extracted at block 306. In one embodiment, the L method is applied to determine the number of clusters in clustering and segmentation.

In some embodiments, contacts may be organized based on a subset of features extracted at block 306. The subset of features may be required to meet some application requirements. For example, the subset of features may be time dependent (e.g., morning group, evening group), location dependent (e.g., home group, work group, etc.). In some embodiments, contacts may be organized based on interaction data associated with a communication modality, such as call groups, SMS groups, proximity groups, SNS or email groups.

Figure 3B:
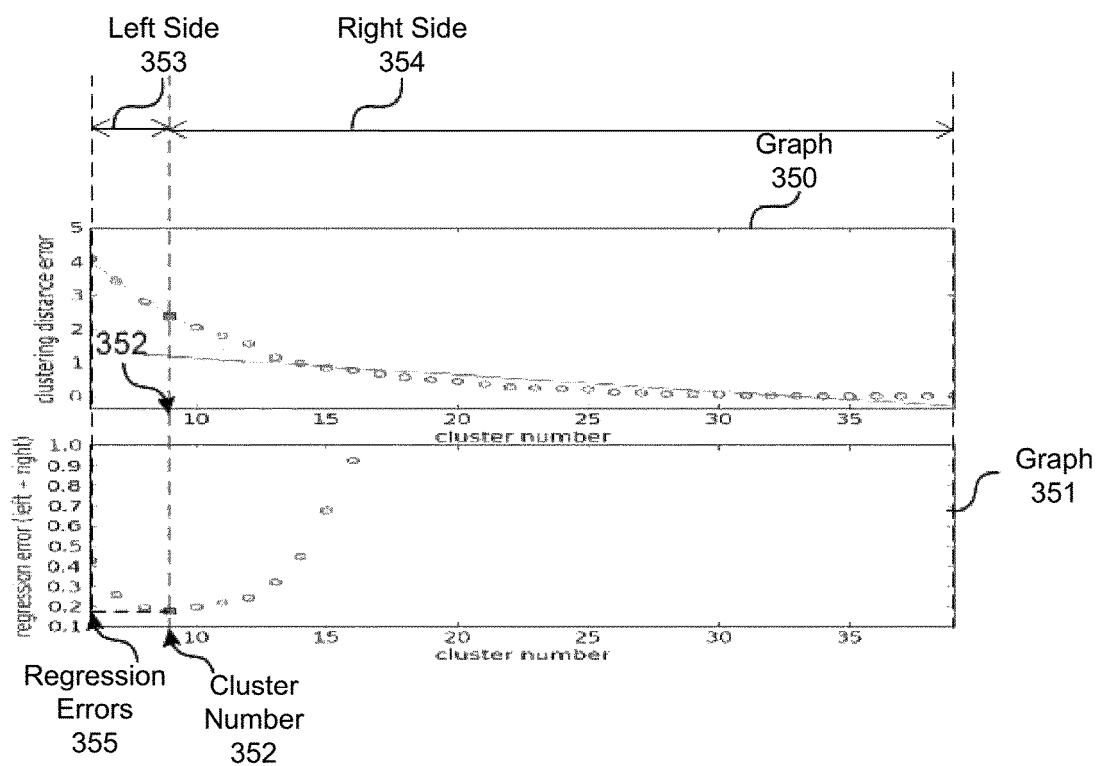
FIG. 3B illustrates using an L method to determine the number of groups into which contacts may be organized according to an embodiment of the present disclosure.

FIG. 3B illustrates using an L method to determine the number of groups into which contacts may be organized according to an embodiment of the present disclosure. Graph 350 illustrates a clustering distance error for each cluster number and graph 351 illustrates the total regression error for each cluster number.

Social grouping for each cluster number K in $[K_{min};K_{max}]$ may be determined. In other words, any possible number of groups into which contacts may be organized may be determined. The minimum number of groups, $K_{min}$, may equal one, indicating all contacts are organized into one group. The maximum number of groups, $K_{min}$, may equal to the number of contacts, indicating each contact is organized into one group. For each grouping result with a given K, the relevant clustering metrics (e.g., a score defined in Equation (1)) may be determined.

$$\text{score}(\text{Cluster}_K) = \Sigma_{k=1}^{K}(\Sigma_{i=k_1}^{k_m} \|x_{k_i} - \text{center}_k\|_2^2) \quad (1)$$

The clustering metric may be used to measure the total variance of each cluster. The more clusters, the smaller the total variance may be. As illustrated in graph 350, the total variance decreases when the cluster number increases.

Subsequently, for each K in $[K_{min}+1;K_{max}-1]$, regression for the left-side (L1:$[K_{min};K]$) and regression for the right side (L2:$[K;K_{max}]$) are determined, respectively. The sum of regression errors, RegressionError(L1)+RegressionError (L2), may be determined based on the left-side regression and right-side regression. For example, for the cluster number 352, regression for the left-side 353 and regression for the right side 354 may be determined, respectively. The total sum or regression errors 355 for the cluster number 352 may be determined by adding the regressions for the left-side 353 and for the right-side 354. The optimal K is selected according to the sum of regression errors, such that the minimum regression error is provided. In the illustrated example, the optimal K is selected to be the cluster number 352 because the cluster number 352 has the minimum total regression error 355 among all the cluster numbers.

In various embodiments, organization of contacts determined on a device may be synchronized among all the devices a user uses to interact with the user's contacts. Social grouping is consistent among all of a user's devices. For example, a user may use a cellphone to interact with contacts during the day and a tablet to interact with contacts at night. The user's contacts may be organized based on records from the cellphone and the tablet. The user's contacts may be organized on the cellphone, the tablet, or both. Once contacts are organized on the cellphone, the organization is synchronized from the cellphone to the tablet, or vice versa. As such, contacts are organized consistently between the cellphone and the tablet.

At block 310, each group that is formed at block 308, may be characterized. In various embodiments, a group may be characterized based on the group size or group significance ranking in terms of closeness between a contact and a user. Characteristics associated with a group of a user's contacts may be determined from a ground truth of the user's social groups. The ground truth of a user's social group may be collected by detecting the labels defined by the user. A user may label his or her contacts into various categories such as: Friend, Colleague, Acquaintance, Family/Relative, Spouse/Partner, Business, and other. The group formed at block 308 may be compared with the ground truth by grouping metrics (e.g., clustering metric such as purity). In further embodiments, information relating to the group size, representative features, distinct time or location patterns of group communications, and closeness ranking of contacts may be determined and used to characterize a group. In some embodiments, semi-supervised user-specific rules may be defined and used to characterize groups. User-specific rules may include, for example, a rule that evening calls are with close friends, a rule that calls from an area code are with family members, a rule that a large size of SMS messages are with close friends or family members, etc.

Organization of contacts and/or characterization of groups may be performed periodically or adaptively to reflect changes in groups of contacts. Due to changes in the activity and communication patterns of individuals, groups of contacts may change. In some embodiments, organizing contacts may be performed periodically (e.g., every week, every month, every quarter). The contact organization period may be defined by a user or subject to a system default.

Contacts may be organized dynamically and adaptively. In some embodiments, contacts may be organized in response to a triggering event. For example, a change may be detected in a user's communication behavior (e.g., a significant increase in calls or SMS messages in a period), a user's contacts (e.g., a contact book, an email contact list, etc.) are significantly updated, or a change is detected in user's home or work location.

In some embodiments, contacts may be organized to reflect group dynamics and group evolutions. The group dynamics may be captured and the group evolution may be monitored. Groups may be subject to changes. Group evolution may include, for example, a formation of a new group, a change in group size, a change in group characterization, or a termination of a group. Group dynamics may be detected by analyzing the records (e.g., Bluetooth logs, call logs, email histories, etc.) obtained from one or more record sources. As such, group evolution may be captured and thereby provide a basis for making decisions (e.g., a user's privacy settings, business decisions, etc.) For example, a group member Bob leaves team A and joins team B, and as a result, both the groups team A and team B have changed. Such changes may be detected by analyzing Bob's communication records such as call logs or Bluetooth logs. For example, Bob may interact more frequently with members of the group team B and less frequently with members of the group team A. These group dynamics may be captured and the group evolution is monitored. In addition, relevant group settings (e.g., sharing policies) for the groups team A and team B may take effect immediately. For instance, the ex-member Bob may be excluded from sharing documents or services in the group team A but included in sharing documents or services in the group team B.

Whether the organization of contacts needs to be updated may be determined according to the group evolution. If there is a significant change in the user's contact group evolution, the current organization of the user's contacts needs to be updated. In one embodiment, a user's contacts may be organized less frequently upon determining that there is no or little significant change in a user's contact group evolution. The user's contacts may be organized more frequently upon determining that there is a significant change in a user's contact group evolution. In some embodiments, group evolutions may be application specific and a user's contacts may be organized differently for different applications. For example, for a user, a group that is for business applications and including the user's colleagues is relatively stable compared to a group that is for social applications and including the user's social connections. Social groups such as hiking and skiing are subject to weather and may have their own seasonal cycles. These groups may evolve quickly and adaptively based on seasons and real-time weather conditions. Accordingly, the user's contacts may be organized less frequently for the group for business applications than for the group for social applications. In general, the user's contacts may be periodically or intermittently organized at suitable times or frequencies based on the unique attributes of the group.

Figure 4:
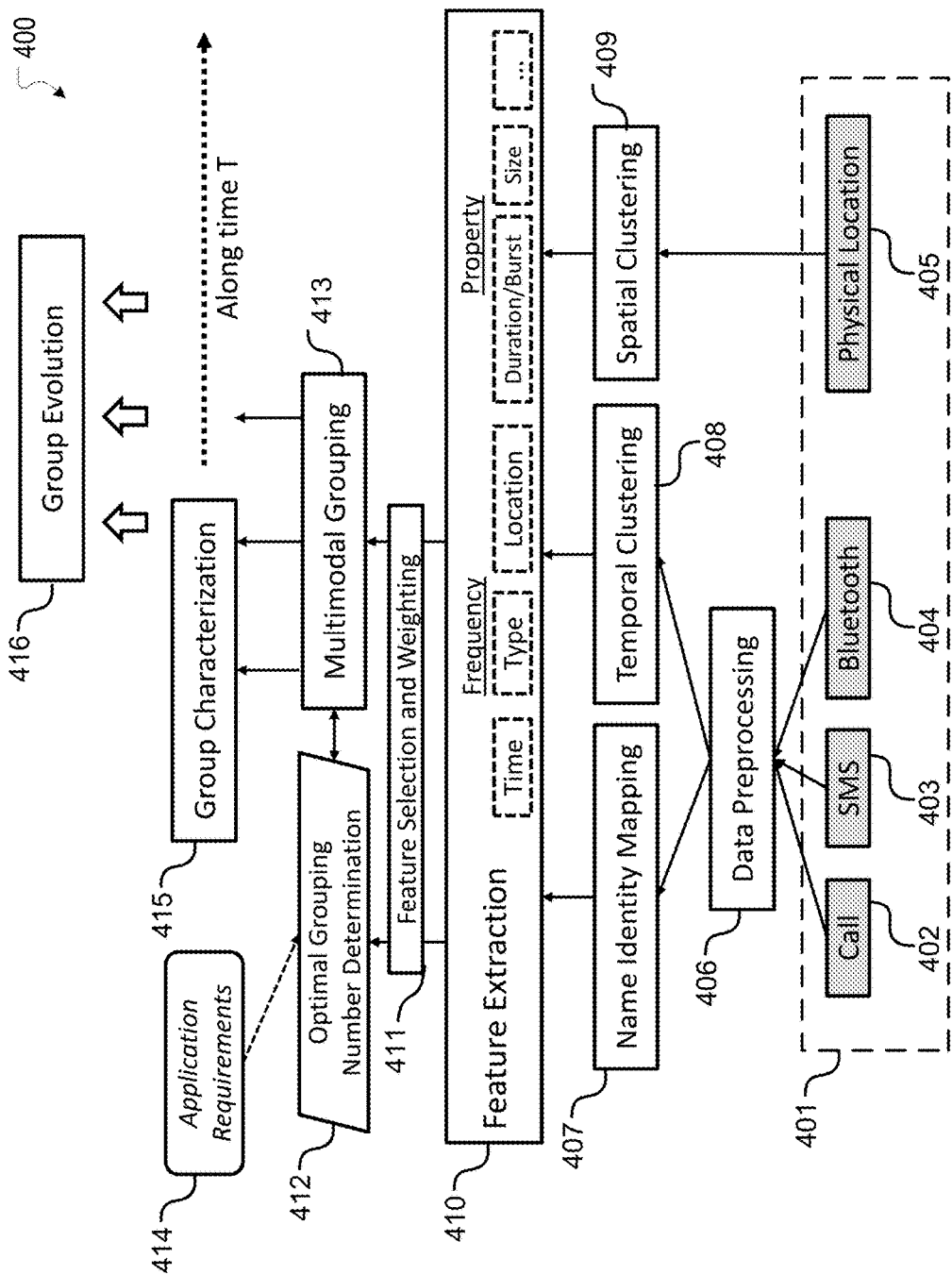
FIG. 4 illustrates an example diagram of a system for organizing contacts in a user-centric manner according to an embodiment of the present disclosure.

FIG. 4 illustrates an example diagram of a system 400 for organizing contacts in a user-centric manner according to an embodiment of the present disclosure. A call log 402, an SMS log 403, a Bluetooth log 404 as well as a location log 405 are collected, all of which may be collectively referred to as records 401. Records 401 may further include a Wi-Fi connection log, an NFC log, an application (e.g., emails, social networks, games, web browser, etc.) log, etc. Records may be obtained from one or more devices belonging to the user or from an Application Programming Interface ("API"). The API or other communication interfaces for provision of the records may be included in or associated with a computer system or data store that is managed, supported, or utilized by the user or by an entity other than the user. Such a computer system or data store may be local or remote and, in relation to a device of the user, may function as a server (e.g., in a private or public cloud) or peer. Records obtained from different record sources may be processed and analyzed together to organize the contacts of the user. Interaction data associated with a user's contacts may be determined from the records 401, such as by a data processing module 406. Name identity mapping 407 may be performed. One or more records 401 may be processed such that a user's interactions with a contact via different communication modalities may be mapped to the same contact. The call log 402, the SMS log 403, and the Bluetooth log 404 may be processed such that interactions between a contact and a user is associated with the contact across various records 401.

Features may be extracted from the interaction data and/or various records 401. Temporal clustering 408 and spatial clustering 409 may be performed to extract features such as a frequency, a duration, a property, and/or a proximity of an interaction, a significant location, and/or a significant time of a user. One or more single-modal feature vectors may be formed. A global feature vector may be created by combining single-modal feature vectors. The global feature vector may be integrated with time and location, representing the multimodal attributes of social connections.

The feature vector 410 includes various features such as a frequency (e.g., a time, a type, a location) of an interaction based on a communication modality, or a duration, a burst, or a size of the interaction based on the communication modality. Feature selection and weighting 411 may be performed to normalize a global feature vector and/or distinguish and enhance the discriminative power of each individual feature. Uniform weights applied to each feature of a global feature vector may avoid model overfitting.

Multimodal grouping 413 entails that contacts may be organized into a varying number of groups based on the global feature vector by performing different levels of clustering. The optimal grouping number 412 may be determined. For example, K-means clustering may be applied to determine the optimal group number, which may be subject to veracious application requirements 414. The application requirements 414 may include a specific number of groups for a particular communication modality. For example, a user's contacts need to be organized into five groups under the call communication modality. Each group may be characterized 415, and group evolution 416 may be observed over time.

Figure 5A:
FIG. 5A is a table illustrating example features of various communication modalities according to an embodiment of the present disclosure.

FIG. 5A is a table 500 illustrating example features of various communication modalities according to an embodiment of the present disclosure. The table 500 comprises features corresponding to communication modalities, which may include phone calls 501, SMS 502, and Bluetooth 503, for a user. Features may include a time specific frequency 510, a type specific frequency 511, a location specific frequency 512, and an average duration 513 of each communication modality. The time specific frequency 510 may include sub-features weekday 514 and weekend 515. The weekday specific frequency 514 may include features morning 516, afternoon 517, evening 518, and night 519. The weekend specific frequency 515 may further include features morning 520, afternoon 521, evening 522, and night 523. The type specific frequency 511 may include features incoming and missed 524, and outgoing 525. The location specific frequency 512 may include features home 526, work 527, and elsewhere 528.

The features 510-513 may be extracted from a user's interaction data for communication modalities 501-503. Some features may not be applicable to some communication modalities. For example, the feature incoming and missed 524 and outgoing 525 are not applicable to the communication modality Bluetooth 503, and the feature average duration 513 is not applicable to the communication modality SMS 502.

Figure 5B:
FIG. 5B is a table illustrating example features of various communication modalities according to an embodiment of the present disclosure.

FIG. 5B is a table 530 illustrating example features of various communication modalities according to an embodiment of the present disclosure. The table 530 comprises features corresponding to communication modalities, which may include phone calls 501, SMS 502, Bluetooth 503, and Social Network Service (SNS) 531 for a user. Features may include a time specific frequency 510, a type specific frequency 511, a location specific frequency 512, a duration 513, and burst length 532 of each communication modality. The time specific frequency 510 may include sub-features weekday 514 and weekend 515. The weekday specific frequency 514 may include features morning 516, afternoon 517, evening 518, and night 519. The weekend specific frequency 515 may further include features morning 520, afternoon 521, evening 522, and night 523. The type specific frequency 511 may include features incoming and missed 524, and outgoing 525. The location specific frequency 512 may include features home 526, work 527, and elsewhere 528.

The features 510-513 and 532 may be extracted from a user's interaction data for communication modalities 501-503 and 531. Some features may not be applicable to some communication modalities. For example, the feature burst length is not applicable to the communication modalities call 501 and Bluetooth 503. Moreover, the interaction data for communication modalities 501-503 and 531 may be generated based on records obtained from multiple record sources. For example, the interaction data for the communication modalities 501-503 may be generated based on the records obtained from the user's cell phone, whereas the interaction data for the communication modality 531 may be generated based on the records obtained from the user's SNS account. The interaction data generated based on the records obtained from different record sources may be processed together.

Figure 5C:
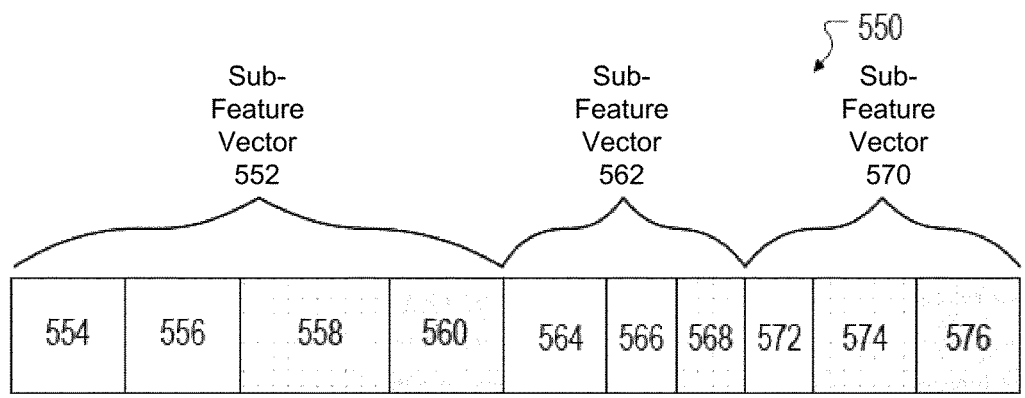
FIG. 5C illustrates an example global feature vector according to an embodiment of the present disclosure.

FIG. 5C illustrates an example global feature vector 550 in accordance with an embodiment of the present disclosure. The global feature vector 550 comprises a sub-feature vector 552, a sub-feature vector 562, and a sub-feature vector 570. The sub-feature vector 552, the sub-feature vector 562, and the sub-feature vector 570 correspond to single-modal feature vectors for the communication modality call $F_{call}$ 501 with 14 dimensions, for the communication modality SMS $F_{sms}$ 502 with 13 dimensions, and for the communication modality $F_{Bluetooth}$ Bluetooth 503 with 12 dimensions, illustrated in FIG. 5A, respectively.

The sub-feature vector 552 reflects features 554, 556, 558, and 560, which correspond to time specific frequency 510, type specific frequency 511, location specific frequency 512, and average duration 513, illustrated in FIG. 5A, respectively. The subfeature vector 562 reflects features 564, 566, 568, which correspond to time specific frequency 510, type specific frequency 511, and location specific frequency 512, respectively. The subfeature vector 570 reflects features 572, 574, 576, which correspond to time specific frequency 510, location specific frequency 512, and average duration 513, respectively.

Figure 6:
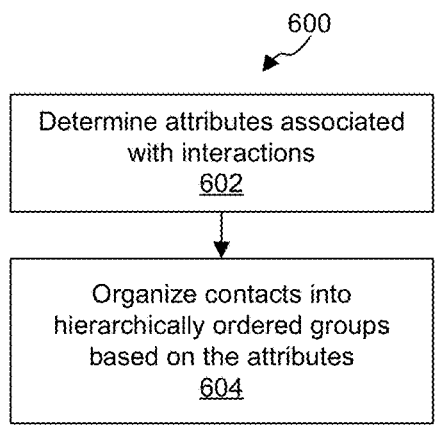
FIG. 6 illustrates an example flowchart of a method for organizing contacts in a user-centric manner according to an embodiment of the present disclosure.

FIG. 6 illustrates an example flowchart of a method 600 for organizing contacts in a user-centric manner according to an embodiment of the present disclosure. Method 600 may be implemented by a device as described with reference to FIG. 1, or another similar device. At block 602, the device determines attributes associated with interactions. As described, the interactions may be between the device that a user is using to interact with one or more contacts. Further, the interactions may be based on multiple devices that the user uses to interact with the contacts.

In block 604, the contacts are organized into hierarchically ordered groups based upon the attributes. The attributes may be used to organize the contacts into one or more groups. Rather than using a flat set of groups, the groups into which contacts may be organized may be structured in a hierarchy. Within the hierarchy, for example, a group may have one or more subgroups arranged beneath the group. Thus, a subgroup, which is a type of group, may be completely contained by the group above in the hierarchy. A subgroup may be viewed as a subset of contacts of the group immediately above the subgroup in the hierarchy. In one aspect, organizing the contacts may include storing the contacts in the hierarchically ordered groups or grouping.

Figure 7:
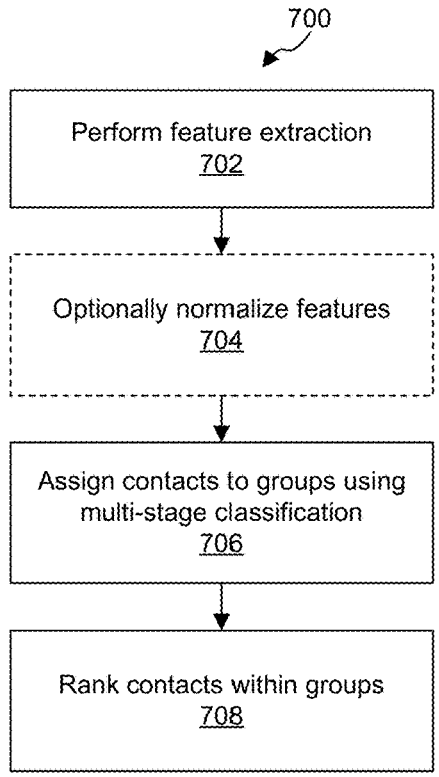
FIG. 7 illustrates an example flowchart of a method for organizing contacts in a user-centric manner according to an embodiment of the present disclosure.

FIG. 7 illustrates an example flowchart of a method 700 for organizing contacts in a user-centric manner according to an embodiment of the present disclosure. Method 700 may be implemented by a device as described with reference to FIG. 1, or another similar device. At block 702, feature extraction is performed. One or more features, as described herein, may be extracted from the interactions, e.g., from attributes of the interactions. In one aspect, the features that are extracted may include a feature set that goes beyond frequency as will be described herein in greater detail.

Block 704 may be optionally performed. At block 704, the features may be normalized. In one aspect, for selected feature dimensions in the feature vector, the values may be normalized with respect to the user. For example, feature dimension values may be normalized by the maximum absolute value stored for the particular feature dimension being normalized. The normalization provides a user-adaptive approach where a user's data is normalized with respect to his or her own data as opposed to using user data from a variety of users. As such, the resulting classification that is performed may achieve greater accuracy since the results for the user are not skewed by training data involving other users that may utilize communications to a greater extent or a lesser extent than the user.

At block 706, the device may assign contacts to groups using multi-stage classification. In one aspect, the extracted features may be used to classify the contacts into one or more groups. Within the multi-stage classification process, one or more features extracted from the attributes may be prioritized differently than other features. Further, in a first classification stage, for example, one or more feature dimensions may be used where each different feature dimension has a priority in the first classification stage. In a second classification stage, one or more feature dimensions may be used. The feature dimension used in the second classification stage may be the same as used in the first classification stage or different. Further, the prioritization of the feature dimensions used in the second classification stage may or may not be the same as in other stages of the multi-stage classification process.

At block 708, the device may rank contacts within the groups. In one aspect, the contacts within the various groups may be ranked according to closeness. Consider the case of a friend group. Using a ranking that is based upon closeness of the contact to the user, the device may determine whether the contact is a close friend of the user or a casual friend of the user. The closeness, which may be expressed as a closeness score, may indicate the strength of a social connection between the user and a contact.

In one aspect, users may be asked to assign a closeness score to each of a plurality of groups. The groups may include important contacts, family, friends, colleagues, significant others, or the like. The device may implement a regression-based ranking technique that determines weights for each feature dimension of a set of features dimensions to track a per-category closeness score.

In general, contacts often have unique feature vectors. Accordingly, the device may utilize the feature vectors to determine a closeness score for each individual contact of the user. The users within a given group may be ranked according to closeness to the user. The closeness score allows the device to distinguish between contacts in a same group. For example, the device may distinguish between close friends (contacts determined to be the friend group with higher closeness scores) and casual acquaintances (contacts determined to be in the friend group with lower closeness scores).

Figure 8:
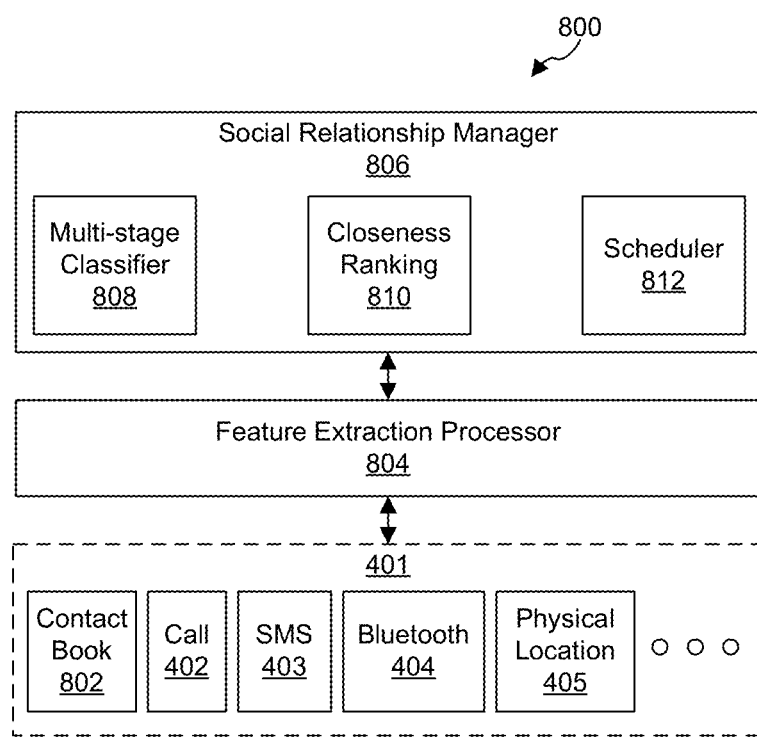
FIG. 8 illustrates an example diagram of a system for organizing contacts in a user-centric manner according to an embodiment of the present disclosure.

FIG. 8 illustrates an example diagram of a system 800 for organizing contacts in a user-centric manner according to an embodiment of the present disclosure. System 800, as pictured, includes one or more elements of system 400 described with reference to FIG. 4. For example, system 800 includes records 401. Records 401 include a call log 402, an SMS log 403, a Bluetooth log 404, and a (physical) location log 405. Records 401 further may include a contact book 802 and/or other record types as previously described.

Contact book 802 may be a database of contacts that have been stored. The contacts may be stored locally on the device. In one aspect, contacts stored in contact book 802 may be contacts that the user of the device as actively, or affirmatively, decided to store or create a contact record. In this regard, contact book 802 may be differentiated from a list or other database of contacts that may have interacted with the user, but for which the user did not choose to create a contact in contact book 802.

Feature extraction processor 804 is configured to extract one or more features. In one aspect, feature extraction processor 804 may extract any of the various features previously described within this disclosure. In general, feature extraction processor 804 may extract spatial features, temporal features (e.g., spatio-temporal features), statistical features such as frequency, periodicity, continuity, and pattern-based features such as bursts, pickup (answering and/or responding) ratio for received communications. For each contact, for example, feature extraction processor 804 may determine, or extract, one or more of the aforementioned features.

Features extracted from the records 401 may be provided to social relationship manager 806. As pictured, social relationship manager 806 includes a multi-stage classifier 808, a closeness ranking processor 810, and a scheduler 812. Multi-stage classifier 808 may be configured to evaluate the feature dimensions using a plurality of stages to form hierarchically ordered groups of the contacts. Multi-stage classifier 808 may determine social relationships between the user and the contacts. In one aspect, multi-stage classifier 808 may determine relationships incrementally. For example, first a classification may be performed, followed by increasingly granular classifications of the initially classified contacts to determine subgroups of prior determined groups of contacts.

Closeness ranking processor 810 may be configured to determine the ranking of the contacts in the various groups determined by multi-stage classifier 808. Scheduler 812 may be configured to manage the operations performed by system 800. For example, each of feature extraction processor 804, multi-stage classifier 808, and/or closeness ranking processor 810 may be implemented as a background process that may be initiated by scheduler 812.

FIG. 8 is provided for purposes of illustration only. In one aspect, the features determined by feature extraction processor 804 may be independent of those described with reference to FIG. 4. In another aspect, the features determined by processor 804 may be in combination with, or complement, those described with reference to FIG. 4. In this regard, it should be appreciated that one or more of the blocks of FIG. 4, e.g., the data preprocessing 406, name identity mapping 407, and various clustering blocks may be included in system 800.

Figure 9:
FIG. 9 is a table illustrating example features of various communication modalities according to an embodiment of the present disclosure.

FIG. 9 is a table 900 illustrating example features of various communication modalities according to an embodiment of the present disclosure. In one aspect, table 900 illustrates example features and/or feature categories that may be extracted by feature extraction processor 804 of FIG. 8. Within each feature category, it should be appreciated that feature extraction processor 804 may be configured to extract one or more different features. The features may be represented in any of the various formats described within this disclosure. Table 900 further illustrates the particular modalities for which the different feature categories may be extracted.

In general, feature extraction processor 804 may extract features relating to a user's reaction to incoming communications 902, weekly patterns 904, working hour/inconvenient time 906, burst of communications 908, continuity and gaps 910, adaptive time windows 912, location of communication 914, statistics of longer calls 916, total duration and/or frequency 918, and/or saved in contact book 920.

Features within the reaction to incoming communications 902 feature category measure the way in which a user reacts, or responds, to an incoming communication. An incoming communication may include a call, whether voice and/or video, and/or SMS (e.g., text). In one aspect, the reaction to an incoming communication may be the particular operation that is initiated by the user on his or her device. Exemplary reactions may include, but are not limited to, answering a call, allowing the call to go unanswered, and/or calling the contact that initiated a call back within a predetermined amount of time such as within an hour, within several hours, or within the same calendar day. Thus, feature extraction processor 804 may determine the number of calls from each contact that are answered or missed, how many missed calls are returned within a given amount of time, and a ratio between any of the aforementioned features such as the ratio of incoming calls to outgoing calls.

Features within the weekly pattern 904 feature category indicate interactions occurring on a device of the user that exhibit a week-by-week pattern. One exemplary weekly pattern may include the user regularly contacting a remote family member each week. The particular time of the communication each week may vary. Feature extraction module 804, however, still may determine that the communication between the user and the contact occurs each week despite occurring at varying times and/or even varying days of the week. Further, week-by-week patterns may be determined from multimodal communications, e.g., a call to a contact one week, a text to the same context the next, etc.

Features the within working hour/inconvenient time 906 feature group may indicate whether a communication occurs during a time span designated as working hours or as inconvenient hours. Working hours for a user may be designated as weekdays from 9:00 a.m. to 5:00 p.m. It should be appreciated, however, that the particular days designated as working hours for a user may vary. For example, one user's working hours may include Saturday and/or Sunday, while another user's working hours may be limited to weekdays. Further, the particular time span designated as working hours may vary. One user may have working hours as previously specified while another user may have working hours specified as afternoons such as from 2:00 p.m. to 10:00 p.m. Inconvenient hours may be a designated time span and may change according to context as will be described herein in greater detail. Both the time span and the particular days designated as working days and/or inconvenient times may vary from one user to another. Information about whether a communication with a contact occurs during working hours and/or during inconvenient times may indicate whether the contact is likely a colleague.

Features within the burst of communications 908 feature category generally indicate how often, or how many times, the user has communicated with a same contact, whether through one or more different modalities, within a given period of time. For example, a user may call a particular contact several times in a brief amount of time. In another example, the user and a contact, or contacts, may send messages to one another back and forth conducting a conversation using a plurality of text messages within a brief amount of time. In one example, the time span of a burst, or over which the number of communications may be measured and considered a burst, may be limited to a finite amount of time such as 15 minutes, 20 minutes, 25 minutes, etc.

In another example, a burst may be defined as a plurality of communications occurring within a predetermined amount of time measured from the end of a prior communication. For example, a first communication between the user and a selected contact may end at time T1. A second communication between the user and the same selected contact may start at time T2. If the difference between time T2 and time T1 is less than the defined burst time, then the first communication and the second communication are considered part of the same burst. The determination of whether a third communication between the user and the same selected contact is considered part of the same burst will depend upon whether the third communication begins prior to expiration of the burst time as measured from the end of the second communication. It should be appreciated that one or more other communications between the user and other contacts may be interspersed with the communications considered part of the same burst. Such communications, however, are not part of the described burst.

Features within the continuity and gaps 910 feature category generally measure the amount of time that passes between consecutive communications with a contact. Continuity and gaps 910 may measure the amount of time between two calls consecutive between the user and a selected contact, between two consecutive messages between the user and the selected contact, or the amount of time between two consecutive communications of different modality between the user and the selected contact. Continuity of communications between a user and a contact provides an indication of the social relationship between the user and the contact. For example, a contact that is a significant other of a user will likely have continuous, e.g., daily, communication with the user. The amount of time between two consecutive communications between the user and a selected contact, whether of the same or different modality, may be referred to as a gap. In one aspect, gaps may be measured in terms of days and/or a plurality of days. Longer gaps, for example, may indicate more distant social relationships. As was the case with bursts, one or more communications with different users may occur between two consecutive communications between the user and a selected contact, e.g., occur during the gap.

Features within the adaptive time windows 912 feature category facilitate handling of communications that occur, or are detected, near time boundaries. Time boundaries, for example, may be the time boundaries established as part of working hour/inconvenient time 906 features. For example, if the time window boundary for working hours is set to end at 5:00 p.m. and the user typically is involved in a communication at or around that time, the communication may fall into one of two categories arbitrarily. To avoid arbitrary categorization of the communication, time windows used for working hour/inconvenient time 906 features may be further divided into adaptive time windows. Adaptive time windows 912, for example, may be defined as a time span that beings a particular amount of time prior to a time boundary and ends at a particular time after the time boundary. For example, an adaptive window may be defined as beginning at 4:45 p.m. and ending at 5:15 p.m. for a 5:00 p.m. time boundary. Communications occurring within the adaptive time boundary may be evaluated as a temporal feature. For example, communication frequency during the adaptive time window may be determined and accounted for as a temporal feature.

Features within the location of communication 914 feature category indicate the location of the user when, or as, a communication is taking place. Location, whether specified as a coordinate location or determined as home, work, etc., may be used to determine a location distribution between the user and a particular contact. In one aspect, the most dominant location among the location distribution may be determined as a feature.

Features within the statistics of longer calls 916 feature category may be used to identify or determine more meaningful calls. The call log for the user may include calls of short duration. For example, the call log for the user may include a plurality of calls where the user answers the call, explains that she or he is unavailable, and then terminates the call. Frequent occurrence of such short duration calls may distort the statistics of average durations. Features within the statistics of longer calls 916 feature group may filter these short duration calls. In one aspect, calls of less than a minimum duration, e.g., 2 minutes, may be filtered out or removed.

Features within the total duration and/or frequency 918 feature category may measure the total duration of calls between the user and a selected contact, frequency of calls between the user and the selected contact, and/or a total number of messages between the user and a selected contact. Features within the total duration and/or frequency 918 feature category may be used to distinguish more important contacts from lesser important contacts. More important contacts will have higher durations and/or greater frequencies.

The saved in contact book 920 feature may be a binary feature that indicates whether the contact is saved within a contact book of the user. As previously discussed, in one aspect, a contact that is saved within a contact book of the user is one where the user took some affirmative action to save the contact. Contacts that are saved in the contact book of the user may be considered of greater importance than those that are not saved in the contact book of the user.

The various features and feature categories described above may be used for purposes of classifying contacts into hierarchically ordered groups. The features may be used by one or more classifiers arranged in a multi-stage configuration. As discussed, one or more of the features described above may be normalized. In one aspect, however, the saved in contact book 920 feature and the dominant location feature may be excluded from the normalization process.

Figure 10:
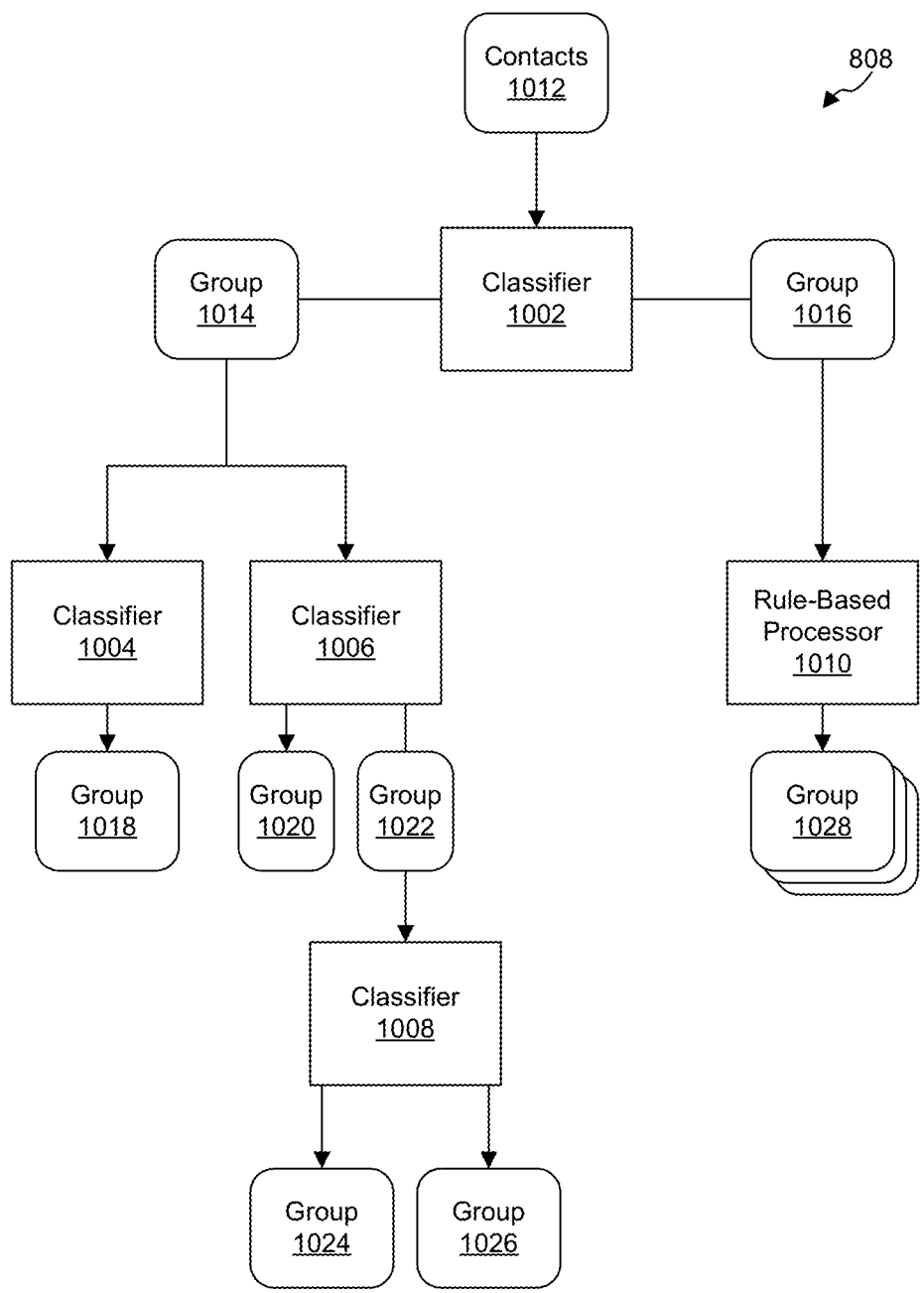
FIG. 10 illustrates an example implementation of multistage classifier according to an embodiment of the present disclosure.

FIG. 10 illustrates an example implementation of multi-stage classifier 808 of FIG. 8 according to an embodiment of the present disclosure. Multi-stage classifier 808 may include a plurality of different classifiers. The classifiers may be are ordered in a plurality of different stages. For purposes of illustration, multi-stage classifier 808 is pictured with classifiers 1002, 1004, 1006, and 1008. Multi-stage classifier 808 further may include a rule-based processor 1010. In one aspect, each of classifiers 1002, 1004, 1006, and 1008 may be implemented as a binary classifier.

In one aspect, classifier 1002 may implement a first stage of multi-stage classifier 808. Classifier 1002 may be configured to perform an initial classification of contacts 1012 into two groups pictured as group 1014 and group 1016. The initial classification may assign contacts 1012 into either group 1014 or group 1016. Those contacts assigned to group 1014 may be determined to be of greater importance than the contacts assigned to group 1016. In one aspect, contacts within group 1014 may be deemed essential while those contacts in group 1016 may be deemed non-essential. Those contacts belonging to group 1014 may be further processed by both classifier 1004 and classifier 1006. Those contacts belonging to group 1016 may be further processed by rule-based processor 1010.

In one example, classifier 1002 may be configured to use features such as total number of gap days (e.g., days without communication) between the user and the contact to determine whether the contact belongs in group 1014 or group 1016. A number of gap days above a particular threshold may indicate that the user belongs in group 1016, for example. In another example, classifier 1002 may use the ratio of incoming to outgoing calls between the user and the contact to determine whether the contact belongs in group 1014 or group 1016. A higher ratio of incoming to outgoing calls, e.g., a ratio above a threshold ratio, may indicate that the contact belongs in group 1014.

In still another example, classifier 1002 may use total communication frequency to determine whether the contact belongs in group 1014 or group 1016. A frequency above a particular threshold may indicate membership of the contact in group 1014, while a frequency below the threshold may indicate membership of contact in group 1016. Classifier 1002 may use median call duration to determine whether the contact belongs in group 1014 or group 1016. A median call duration above a particular threshold may indicate that the contact should be in group 1014, while a median call duration below the threshold may indicate that the contact should be in group 1014.

In still another example, the occurrence of communications between a user and a contact that occur during inconvenient times, as may be predefined, may be used to determine whether the contact belongs in group 1014 or group 1016. In illustration, a communication received by the user from a contact between 6:00 p.m. and midnight, which may be defined as an inconvenient time, may indicate that the contact belongs in group 1014. Similarly, the lack of a communication during the time enumerated as inconvenient may indicate that the contact belongs in group 1016.

It should be appreciated that classifier 1002 may utilize the above features individually or in any combination. When used in combination, classifier 1002 may assign weights to the various features used so that particular features are given greater importance than others. A total score, for example, may be calculated using the features. Contacts having a score above a particular threshold may be assigned to group 1014, while contacts with a score not exceeding the threshold may be assigned to group 1016.

Classifier 1004 and classifier 1006 may implement a second stage of multi-stage classifier 808. Classifier 1004 may be configured to determine which of the contacts of group 1014 is considered a significant other of the user. Those contacts determined to be significant others of the user are assigned to group 1018.

In one aspect, classifier 1004 may evaluate contacts in group 1014 using total communication frequency, call frequency between noon and 6:00 p.m. on weekdays, median of call durations, messages on weekday mornings, and/or average call duration on weekends. Higher communication frequency may be indicative of a contact being a significant other of the user. A call frequency exceeding a given threshold between noon and 6:00 p.m. may be indicative that the contact is a significant other of the user, etc.

As noted with respect to classifier 1002, classifier 1004 may utilize the foregoing features individually or in any combination. When used in combination, classifier 1004 may assign weights to the various features used. It should be appreciated that when a feature is used for more than one classifier, the particular weight given to the feature may differ from one classifier to another. Further, the particular thresholds and/or boundaries used may vary. As illustrated with respect to classifiers 1002 and 1004, the time span of interest for classifier 1002 is from 6:00 p.m. to midnight, while for classifier 1004 the time span of interest is from noon to 6:00 p.m.

Classifier 1006 may be configured to determine which contacts of group 1014 are family members and which are non-family members. Those contacts of group 1014 determined to be family members may be assigned to group 1020. Those contacts determined to be non-family members may be assigned to group 1022.

In one aspect, classifier 1006 may evaluate contacts in group 1014 using features such as total call duration on weekends, bursts of calls, ratio between weekend phone call duration and total call duration, median of call durations, ratio of calls being returned on the same day, or the like. Bursts of calls between a user and a contact may be indicative that the user and the contact are family members. A total call duration on weekends that exceeds a threshold call duration for calls between the user and a contact may be indicative that the user and the contact are family members. A ratio between weekend phone call duration and total call duration between the user and a contact that exceeds a threshold ratio may be indicative that the user and the contact are family members.

As discussed, classifier 1006 may evaluate the above features individually or in any combination. When used in combination, classifier 1006 may assign weights to the various features used. Further, when a feature is used for more than one classifier, the particular weight given to the feature and/or the threshold used may differ from one classifier to another.

As pictured, group 1022 is provided to classifier 1008 for further processing. Classifier 1008 may implement a third stage of multi-stage classifier 808. In one aspect, classifier 1008 may be configured to determine which contacts of group 1022 are friends and which are colleagues. Those contacts of group 1022 determined to be friends may be assigned to group 1024. Those contacts of group 1022 determined to be colleagues may be assigned to group 1026.

In one aspect, classifier 1008 may use features including, but not limited to, a ratio between total weekend call duration and total call duration for calls between the user and a contact, total communication frequency, number and/or frequency of calls on weekday mornings, etc. Classifier 1008 may evaluate the above features individually or in any combination. When used in combination, classifier 1008 may assign weights to the various features used. Further, when a feature is used for more than one classifier, the particular weight given to the feature and/or the threshold used may differ from one classifier to another.

It should be appreciated that the various features provided for classifiers 1002, 1004, 1006, and/or 1008 are provided for purposes of illustration only. Any combination of the various features and/or attributes described within this specification may be used.

Group 1016 is provided to rule-based processor 1010. Rule-based processor 1010 may apply one or more predetermined rules to assign different ones of the contacts of group 1016 to one or more different groups 1028. Exemplary rules applied by rule-based processor 1010 may include, but are not limited to, identifying calls from "800" numbers, calls of less than a minimum duration, etc. The rules may specify tags and/or keywords that the device may search for within the contacts of group 1016. Using the rules, rule-based processor 1010 may assign contacts of group 1016 to one of groups 1028. For example, rule-based processor 1010 may determine whether a particular contact is a business assigned to a business group, a wrong number assigned to a wrong number group, a spammer assigned to a spam group, etc.

Other examples of rules that may be applied by rule-based processor 1010 may include, but are not limited to:
- If a number of a calling contact starts with "800" or "801," assign the contact to a business or a spam group.
- If an incoming call has a duration less than a predetermined duration and/or occurs fewer than a minimum number of times, e.g., occurs only one time, assign the call to a wrong number group.
- If a Web query is available execute the Web query using information for the contact and if a result indicates a shop or a business, assign the contact to a business group.
- If the contact has a same area code as the user, assign the contact to a local business group.
- If the number of the calling contact has a foreign country code, assign the contact to a remote family group.
- If the call is less than a minimum duration and is rarely or never returned by the user, assign the contact to a spam group.

In one aspect, rules may be verified through one or more crowdsourcing surveys. For example, different users may be asked to evaluate the quality of one or more of the rules by observing their own call log. An exemplary rule may be to place "800" telephone number contacts into a business and/or a spam group. As part of the survey, users may be asked to determine how likely calls from 800 numbers in their own call log are business spam. In another example, a rule may be specified that contacts of group 1016 associated with calls less than a minimum amount of time are likely wrong numbers. Again, users may be asked, as part of the survey, to determine the likelihood that a number on their call log of less than a minimum length is a wrong number.

Figure 11:
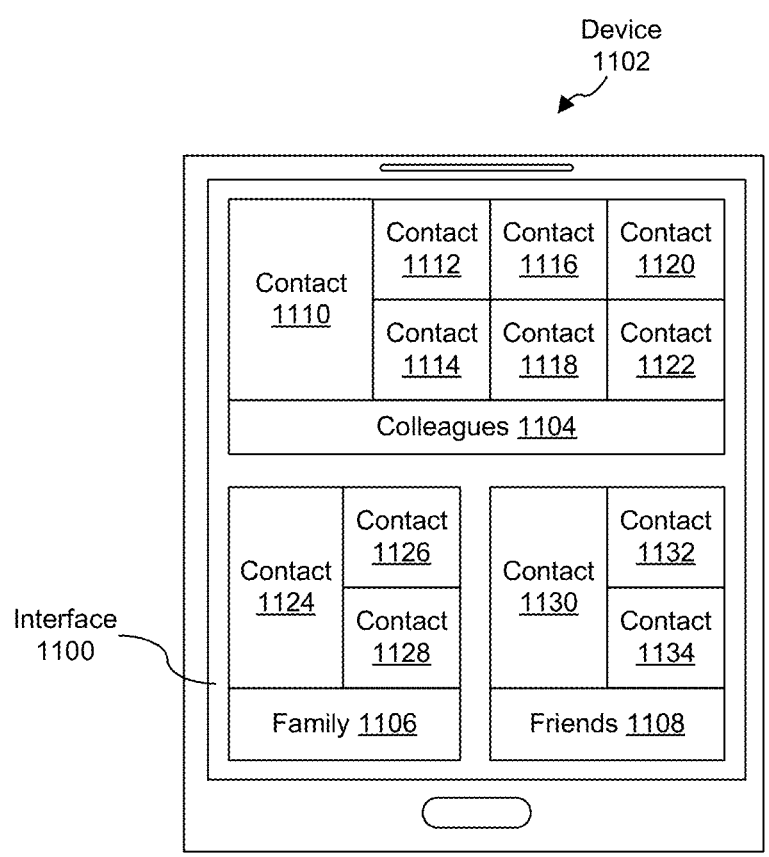
FIG. 11 is a diagram illustrating an example of an interface displayed by a device according to an embodiment of the present disclosure.

FIG. 11 is a diagram illustrating an example of an interface 1100 displayed by a device 1102 according to an embodiment of the present disclosure. Interface 1100 includes multiple regions where each region is reserved for displaying contacts of a particular group. As shown, a first region includes contacts belonging to a colleagues group 1104, a second region includes contacts belonging to a family group 1106, and a third region includes contacts belonging to a friend group 1108.

Within colleagues group 1104, contacts 1110, 1112, 1114, 1116, 1118, 1120, and 1122 are shown. Within family group 1106, contacts 1124, 1126, and 1128 are shown. Within friend group 1108, contacts 1130, 1132, and 1134 are shown. Each of contacts 1110-1134 may be represented using a picture, a name, or other identifier. In one aspect, the contacts within each region may be ranked according to closeness. For example, the contacts may be ordered according to closeness and/or sized according to closeness. Referring to colleagues group 1104, for example, contact 1110 may be considered the closest contact to the user, or at least closer than contacts 1112-1122.

The inventive arrangements described within this disclosure may be used in a variety of different contexts and/or user cases. In one exemplary use case, the inventive arrangements may be used to automatically organize contacts within a device. For example, in cases where a user has many contacts, e.g., hundreds or more, automatically organizing the contacts into groups may significantly reduce complexity of contact management, better identify non-essential contacts that may be purged, and/or help identify those contacts that the user communicates with at various times of interest. In that case, for example, interface 1100 may be displayed on a device as part of a contact management application executing therein.

In another exemplary use case, the inventive arrangements described within this disclosure may be used to select and/or determine which contacts of a plurality of contacts with which to share content. A user, for example, may choose to share, or selectively share, content with one or more of the various groups and/or subgroups of users. In that case, interface 1100 may be displayed responsive to user request to share content with others within an application. The user may easily choose the colleague group 1104 and/or particular contacts within the colleague group, the family group 1106 or particular contacts within the family group, etc.

In still another exemplary use case, the user may trigger or initiate customized ringtones and/or automatic responses to communications based upon the grouping of contacts described herein. For each group or subgroup, the user may specify different configurations and/or action rules can be applied responsive to communications from contacts in the various groups. As an illustrative example, the user may specify that each group have a unique ringtone to more easily determine the group to which a contact belongs when that contact communicates with the user. The user may indicate that calls from particular groups should go directly to voicemail, go unanswered, place the device into a silent mode so that no ring and/or vibration occurs, etc.

Group determination using ringtones, for example, allows the user to quickly determine who may be calling and ascertain urgency of the call. The user may identify a calling contact as spam through the ringtone. Similarly, different auto-response messages may be specified for different groups. Accordingly, when a contact attempts to communicate with the user and the user chooses to respond with an auto-response, the user may be presented with one or more predetermined automatic response options that are specific to the group to which the contact initiating communication belongs. The user may create a set of personalized automatic text responses for the family group and other more formal automatic responses for the colleagues group.

Further, it should be appreciated that the particular group to which a contact belongs may be displayed on the device responsive to receiving a communication from the contact. For example, responsive to a call from a contact that is a member of the spam group, the name of the group may be displayed thereby warning the user that the call is likely spam.

In yet another aspect, the organization of contacts into groups may be maintained entirely on the device of the user. Further, because the organization of contacts into groups may be determined based upon daily communication and interactions, access to other networked systems is not required, thereby increasing data security and privacy. In this regard, a user may configure his or her device to selectively apply encryption and/or choose a particular type and/or strength of encryption, to communications based upon the particular group to which a contact belongs.

It is further contemplated that there may be many other possible uses, applications, and/or variations associated with the various embodiments of the present disclosure.

Hardware Implementation

The foregoing processes and features can be implemented by a wide variety of machine and computer system architectures and in a wide variety of network and computing environments.

Figure 12:
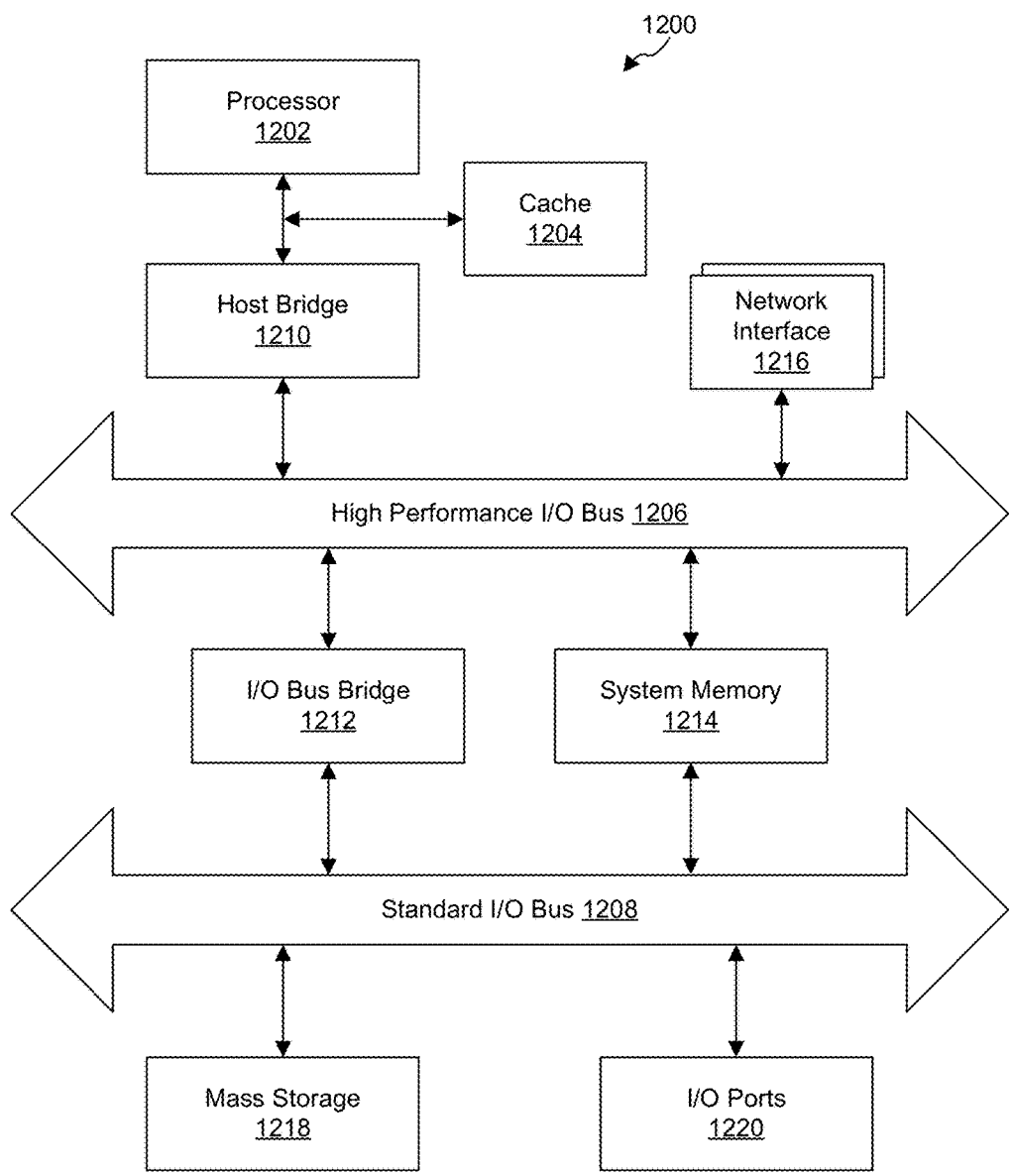
FIG. 12 illustrates an example of a computing device or system that may be used to implement one or more of the embodiments described herein according to an embodiment of the present disclosure.

FIG. 12 illustrates an example of a computer system 1200 that may be used to implement one or more of the embodiments described herein in accordance with an embodiment of the invention. The computer system 1200 includes sets of instructions for causing the computer system 1200 to perform the processes and features, e.g., operations, discussed herein. The computer system 1200 may be connected (e.g., networked) to other machines. In a networked deployment, the computer system 1200 may operate in the capacity of a server machine or a client machine in a client-server network environment, or as a peer machine in a peer-to-peer (or distributed) network environment. In an embodiment of the invention, the computer system 1200 may be a component of the networking system described herein. In an embodiment of the present disclosure, the computer system 1200 may be one server among many that constitutes all or part of a networking system.

The computer system 1200 can include a processor 1202, a cache 1204, and one or more executable modules and drivers, stored on a computer-readable medium, directed to the processes and features described herein. Additionally, the computer system 1200 may include a high performance input/output (I/O) bus 1206 or a standard I/O bus 1208. A host bridge 1210 couples processor 1202 to high performance I/O bus 1206, whereas I/O bus bridge 1212 couples the two buses 1206 and 1208 to each other. A system memory 1214 and one or more network interfaces 1216 couple to high performance I/O bus 1206. The computer system 1200 may further include video memory and a display device coupled to the video memory (not shown). Mass storage 1218 and I/O ports 1220 couple to the standard I/O bus 1208. The computer system 1200 may optionally include a keyboard and pointing device, a display device, or other input/output devices (not shown) coupled to the standard I/O bus 1208. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1200, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1200 are described in greater detail below. In particular, the network interface 1216 provides communication between the computer system 1200 and any of a wide range of networks, such as an Ethernet (e.g., IEEE 802.3) network, a backplane, etc. Network interface 1216 may provide communications over a wired and/or wireless communication link. The mass storage 1218 provides permanent storage for the data and programming instructions to perform the above-described processes and features implemented by the respective computing systems identified above, whereas the system memory 1214 (e.g., DRAM) provides temporary storage for the data and programming instructions when executed by the processor 1202. The I/O ports 1220 may be one or more serial and/or parallel communication ports that provide communication between additional peripheral devices, which may be coupled to the computer system 1200.

The computer system 1200 may include a variety of system architectures, and various components of the computer system 1200 may be rearranged. For example, the cache 1204 may be on-chip with processor 1202. Alternatively, the cache 1204 and the processor 1202 may be packed together as a "processor module", with processor 1202 being referred to as the "processor core". Furthermore, certain embodiments of the invention may neither require nor include all of the above components. For example, peripheral devices coupled to the standard I/O bus 1208 may couple to the high performance I/O bus 1206. In addition, in some embodiments, only a single bus may exist, with the components of the computer system 1200 being coupled to the single bus. Furthermore, the computer system 1200 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1200 that, when read and executed by one or more processors, cause the computer system 1200 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1200, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1202. Initially, the series of instructions may be stored on a storage device, such as the mass storage 1218. However, the series of instructions can be stored on any suitable computer readable storage medium. Furthermore, the series of instructions need not be stored locally, and could be received from a remote storage device, such as a server on a network, via the network interface 1216. The instructions are copied from the storage device, such as the mass storage 1218, into the system memory 1214 and then accessed and executed by the processor 1202. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar storage medium; or any type of medium suitable for storing, encoding, or carrying a series of instructions for execution by the computer system 1200 to perform any one or more of the processes and features described herein.

A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "computer program product" refers to a machine, system, device, and/or manufacture that includes a computer-readable storage medium.

Figure 13:
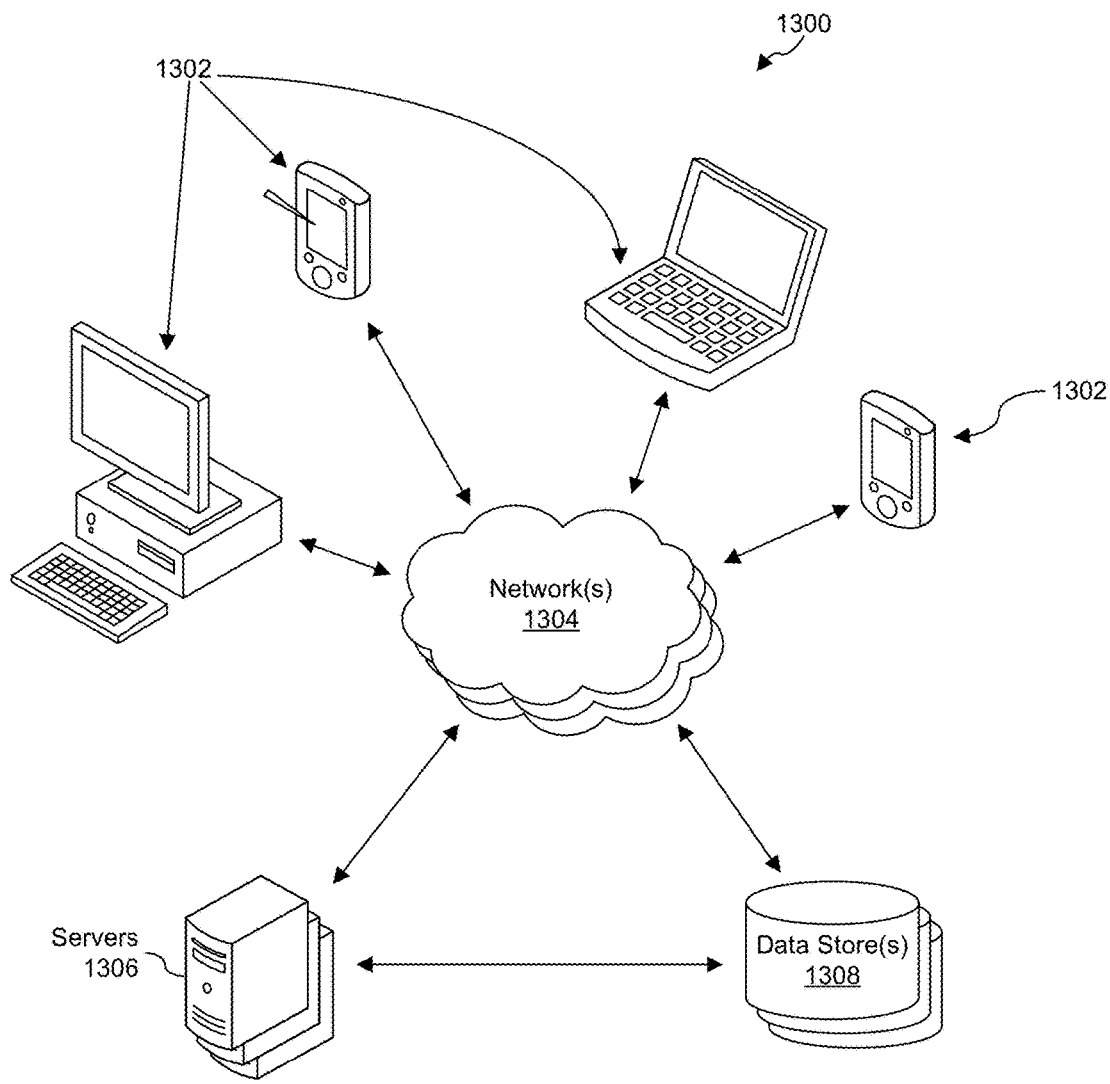
FIG. 13 illustrates a network environment in which various embodiments may be implemented according to an embodiment of the present disclosure.

As discussed, different approaches can be implemented in various environments in accordance with the described embodiments. For example, FIG. 13 illustrates an example network system embodiment (or network environment) 1300 for implementing aspects in accordance with various embodiments. The example network system 1300 can include one or more computing devices, computing systems, electronic devices, client devices, etc. (e.g., 1302). In some instances, each of these devices and/or systems 1302 can correspond to the computer system 1200 in FIG. 12. The example network system 1300 can also include one or more networks 1304. Further, there can be one or more servers 1306 and one or more data stores 1308 in the network system 1300.

As shown in FIG. 13, the one or more example computing devices (i.e., computing systems, electronic devices, client devices, etc.) 1302 can be configured to transmit and receive information to and from various components via the one or more networks 1304. For example, multiple computing devices 1302 can communicate with one another via a Bluetooth network (e.g., 1304). In another example, multiple computing devices 1302 can communicate with one another via the Internet (e.g., 1304). In a further example, multiple computing devices 1302 can communicate with one another via a local area network (e.g., 1304).

In some embodiments, examples of computing devices 1302 can include (but are not limited to) personal computers, desktop computers, laptop/notebook computers, tablet computers, electronic book readers, mobile phones, cellular phones, smart phones, handheld messaging devices, personal data assistants (PDAs), set top boxes, cable boxes, video gaming systems, smart televisions, smart appliances, smart cameras, wearable devices, etc. In some cases, a computing device 1302 can include any device and/or system having a processor. In some case, a computing device 1302 can include any device and/or system configured to communicate via the one or more networks 1304.

Moreover, regarding the computing devices 1302, various hardware elements associated with the computing devices 1302 can be electrically coupled via a bus. As discussed above, elements of computing devices 1302 can include, for example, at least one processor (e.g., central processing unit (CPU)), at least one input device (e.g., a mouse, keyboard, button, microphone, touch sensor, controller, etc.), and at least one output device (e.g., a display screen, speaker, ear/head phone port, tactile/vibration element, printer, etc.). The computing device 1302 can also include one or more storage devices. For example, the computing device 1302 can include optical storage devices, disk drives, and solid-state storage devices (e.g., random access memory ("RAM"), read-only memory ("ROM"), etc.). In another example, the computing device 1302 can include portable or removable media devices, flash cards, memory cards, etc.

Further, the computing device(s) 1302 can include a computer-readable storage media reader, a communications device (e.g., a modem, a network card (wireless or wired), an infrared communication device, etc.). The computer-readable storage media reader can be capable of connecting with or receiving a computer-readable storage medium. The computer readable storage medium can, in some cases, represent various storage devices and storage media for temporarily and/or more permanently storing, interacting with, and accessing data. The communications device can facilitate in transmitting and/or receiving data via the network(s) 1304.

In some embodiments, the computing device 1302 can utilize software modules, services, and/or other elements residing on at least one memory device of the computing device 1302. In some embodiments, the computing device 1302 can utilize an operating system (OS) and/or a program. For example, the computing device 1302 can utilize a web browsing application to interact with and/or access various data (e.g., content) via the network(s) 1304. It should be understood that numerous variations and applications are possible for the various embodiments disclosed herein.

In some embodiments, examples of the one or more networks 1304 can include (but are not limited to) an intranet, a local area network (LAN, WLAN, etc.), a cellular network, the Internet, and/or any combination thereof. Components used for implementing the network system 1300 can depend at least in part upon a type(s) of network(s) and/or environment(s). A person of ordinary skill in the art would recognize various protocols, mechanisms, and relevant parts for communicating via the one or more networks 1304. In some instances, communication over the network(s) 1304 can be achieved via wired connections, wireless connections (WiFi, WiMax, Bluetooth, radio-frequency communications, near field communications, etc.), and/or combinations thereof.

In some embodiments, the one or more networks 1304 can include the Internet, and the one or more servers 1306 can include one or more web servers. The one or more web servers can be configured to receive requests and provide responses, such as by providing data and/or content based on the requests. In some cases, the web server(s) can utilize various server or mid-tier applications, including HTTP servers, CGI servers, FTP servers, Java servers, data servers, and business application servers. The web server(s) can also be configured to execute programs or scripts in reply to requests from the computing devices 1302. For example, the web server(s) can execute at least one web application implemented as at least one script or program. Applications can be written in various suitable programming languages, such as Java®, JavaScript, C, C# or C++, Python, Perl, TCL, etc., and/or combinations thereof.

In some embodiments, the one or more networks 1304 can include a local area network, and the one or more servers 1306 can include a server(s) within the local area network.

In one example, a computing device 1302 within the network(s) 1304 can function as a server. Various other embodiments and/or applications can also be implemented.

In some embodiments, the one or more servers 1306 in the example network system 1300 can include one or more application servers. Furthermore, the one or more applications servers can also be associated with various layers or other elements, components, processes, which can be compatible or operable with one another.

In some embodiments, the network system 1300 can also include one or more data stores 1308. The one or more servers (or components within) 1306 can be configured to perform tasks such as acquiring, reading, interacting with, modifying, or otherwise accessing data from the one or more data stores 1308. In some cases, the one or more data stores 1308 can correspond to any device/system or combination of devices/systems configured for storing, containing, holding, accessing, and/or retrieving data. Examples of the one or more data stores 1308 can include (but are not limited to) any combination and number of data servers, databases, memories, data storage devices, and data storage media, in a standard, clustered, and/or distributed environment.

The one or more application servers can also utilize various types of software, hardware, and/or combinations thereof, configured to integrate or communicate with the one or more data stores 1308. In some cases, the one or more application servers can be configured to execute one or more applications (or features thereof) for one or more computing devices 1302. In one example, the one or more applications servers can handle the processing or accessing of data and business logic for an application(s). Access control services in cooperation with the data store(s) 1308 can be provided by the one or more application servers. The one or more application servers can also be configured to generate content such as text, media, graphics, audio and/or video, which can be transmitted or provided to a user (e.g., via a computing device 1302 of the user). The content can be provided to the user by the one or more servers 1306 in the form of HyperText Markup Language (HTML), Extensible HyperText Markup Language (XHTML), Extensible Markup Language (XML), or various other formats and/or languages. In some cases, the application server can work in conjunction with the web server. Requests, responses, and/or content delivery to and from computing devices 1302 and the application server(s) can be handled by the web server(s). The one or more web and/or application servers (e.g., 1306) are included in FIG. 13 for illustrative purposes.

In some embodiments, the one or more data stores 1308 can include, for example, data tables, memories, databases, or other data storage mechanisms and media for storing data. For example, the data store(s) 1308 can include components configured to store application data, web data, user information, session information, etc. Various other data, such as page image information and access rights information, can also be stored in the one or more data stores 1308. The one or more data stores 1308 can be operable to receive instructions from the one or more servers 1306. The data stores 1308 can acquire, update, process, or otherwise handle data in response to instructions.

In some instances, the data store(s) 1308 can reside at various network locations. For example, the one or more data stores 1308 can reside on a storage medium that is local to and/or resident in one or more of the computing devices 1302. The data store(s) 1308 can also reside on a storage medium that is remote from the devices of the network(s) 1304. Furthermore, in some embodiments, information can be stored in a storage-area network ("SAN"). In addition, data useful for the computing devices 1302, servers 1306, and/or other network components can be stored locally and/or remotely.

In one example, a user of a computing device 1302 can perform a search request using the computing device 1302. In this example, information can be retrieved and provided to the user (via the computing device 1302) in response to the search request. The information can, for example, be provided in the form of search result listings on a web page that is rendered by a browsing application running on the computing device 1302. In some cases, the one or more data stores 1308 can also access information associated with the user (e.g., the identity of the user, search history of the user, etc.) and can obtain search results based on the information associated with the user.

Moreover, in some embodiments, the one or more servers 1306 can each run an operating system (OS). The OS running on a respective server 1306 can provide executable instructions that facilitate the function and performance of the server. Various functions, tasks, and features of the one or more servers 1306 are possible and thus will not be discussed herein in detail. Similarly, various implementations for the OS running on each server are possible and therefore will not be discussed herein in detail.

In some embodiments, various aspects of the present disclosure can also be implemented as one or more services, or at least a portion thereof. Services can communicate using many types of messaging, such as HTML, XHTML, XML, Simple Object Access Protocol (SOAP), etc. Further, various embodiments can utilize network communicational protocols, such as TCP/IP, OSI, FTP, UPnP, NFS, CIFS, etc. Examples of the one or more networks 1304 can further include wide-area networks, virtual private networks, extranets, public switched telephone networks, infrared networks, and/or any combinations thereof.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "executable operation" is an operation performed by a computing system or a processor within a computing system. Examples of executable operations include, but are not limited to, "processing," "computing," "calculating," "determining," "displaying," "comparing," or the like. Such operations refer to actions and/or processes of the computing system, e.g., a computer, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "plurality" means two or more than two. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship. In general, the term "user" means a human being. The terms first, second, etc. may be used herein to describe various elements. These elements should not be limited by these terms, as these terms are only used to distinguish one element from another unless stated otherwise or the context clearly indicates otherwise.

It should also be appreciated that the specification and drawings are to be regarded in an illustrative sense. It can be evident that various changes, alterations, and modifications can be made thereunto without departing from the broader spirit and scope of the disclosed technology.

The corresponding structures, materials, acts, and equivalents of all means or step plus function elements in the claims below are intended to include any structure, material, or act for performing the function in combination with other claimed elements as specifically claimed.

A method may include determining, by a device, a set of attributes associated with interactions between a user and a set of contacts. The set of attributes may be associated with the interactions related to the device. The method may include organizing the contacts into a plurality of groups, wherein the plurality of groups are hierarchically ordered with at least one group of the plurality of groups being a subgroup of another group of the plurality of groups.

Organizing the contacts into a plurality of groups may include classifying the contacts through a plurality of ordered, classification stages.

The method may include assigning contacts of the set of contacts into a first group and a second group, wherein the first group comprises important contacts, and assigning contacts belonging to the first group into a family subgroup or a non-family subgroup.

The method may include determining at least one contact from the family subgroup to be a significant other of the user.

The method may include, for a contact of the non-family subgroup, determining whether the contact is a member of a friend subgroup or a colleague subgroup.

The method may also include normalizing a feature for the user, wherein the feature is determined from the set of attributes.

Determining, by the device, a set of attributes associated with interactions between a user and a set of contacts may include determining an operation initiated on the device in response to an incoming communication.

Determining, by the device, a set of attributes associated with interactions between a user and a set of contacts may include determining whether a contact involved in an interaction with the user is saved as an entry in a user-maintained contact list.

A system includes a processor programmed to initiate executable operations. The executable operations may include determining a set of attributes associated with interactions between a user and a set of contacts. The set of attributes may be associated with the interactions related to the device. The executable operations may include organizing the contacts into a plurality of groups, wherein the plurality of groups are hierarchically ordered with at least one group of the plurality of groups being a subgroup of another group of the plurality of groups.

Organizing the contacts into a plurality of groups may include classifying the contacts through a plurality of ordered, classification stages.

The processor may be programmed to initiate executable operations including assigning contacts of the set of contacts into a first group and a second group, wherein the first group includes important contacts, and assigning contacts belonging to the first group into a family subgroup or a non-family subgroup.

The processor may be programmed to initiate executable operations including determining at least one contact from the family subgroup to be a significant other of the user.

The processor may also be programmed to initiate executable operations including, for a contact of the non-family subgroup, determining whether the contact is a member of a friend subgroup or a colleague subgroup.

The processor may also be programmed to initiate executable operations including normalizing a feature for the user, wherein the feature is determined from the set of attributes.

Determining a set of attributes associated with interactions between a user and a set of contacts may include determining an operation initiated on the device in response to an incoming communication.

Determining a set of attributes associated with interactions between a user and a set of contacts may include determining whether a contact involved in an interaction with the user is saved as an entry in a user-maintained contact list.

A computer program product includes a computer readable storage medium having program code stored thereon. The program code is executable by a processor to perform a method. The method may include determining a set of attributes associated with interactions between a user and a set of contacts, the set of attributes associated with the interactions related to the device, and organizing the contacts into a plurality of groups, wherein the plurality of groups are hierarchically ordered with at least one group of the plurality of groups being a subgroup of another group of the plurality of groups.

Organizing the contacts into a plurality of groups may include classifying the contacts through a plurality of ordered, classification stages.

Determining a set of attributes associated with interactions between a user and a set of contacts may include determining an operation initiated on the device in response to an incoming communication.

Determining a set of attributes associated with interactions between a user and a set of contacts may include determining whether a contact involved in an interaction with the user is saved as an entry in a user-maintained contact list.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   determining, by a device, a set of attributes associated with interactions between a user and a set of contacts, the set of attributes associated with the interactions related to the device;
   wherein the set of attributes includes ratios of incoming to outgoing calls between the user and the set of contacts;
   classifying, using the device, the set of contacts into a plurality of groups by processing the set of attributes for the set of contacts through a plurality of ordered classification stages, wherein the plurality of groups are hierarchically ordered with at least one group of the plurality of groups being a subgroup of another group of the plurality of groups;
   associating, using the device, an action rule with a selected group of the plurality of groups, wherein the action rule specifies a plurality of automatic responses performed by the device applied to communications received from contacts belonging to the selected group;
   presenting, on a display screen of the device, the plurality of automatic responses as options in response to receiving a selected communication in the device from a contact belonging to the selected group and applying, using the device, the action rule to the selected communication; and
   performing a particular automatic response from the plurality of automatic responses, using the device, in response to the device receiving the selected communication from the contact in the selected group and receiving a user selection of the particular automatic response from the plurality of automatic responses presented as options.

2. The method of claim 1, wherein the set of attributes includes user reactions to incoming communications from the set of contacts, wherein the user reactions include operations initiated by the user on the device in response to the incoming communications.

3. The method of claim 1, wherein the set of attributes includes average duration of phone calls, the method further comprising:
   removing phone calls having a duration less than a minimum duration from use in determining the average duration of phone calls.

4. The method of claim 1, wherein the plurality of automatic responses are specific to the selected group.

5. The method of claim 1, wherein the set of attributes includes physical proximity between the set of contacts and the user for the interactions based upon location.

6. The method of claim 1, wherein the set of attributes includes a number of communication modalities the user uses to communicate with the set of contacts.

7. The method of claim 1, further comprising:
   displaying an interface having a plurality of regions, wherein each region corresponds to a different group of the plurality of groups and, within each region, identifiers corresponding to selected contacts of the set of contacts are displayed with at least one of an order determined according closeness of the selected contacts to the user or are sized according to closeness of the selected contacts to the user.

8. The method of claim 1, further comprising: displaying an interface having a plurality of regions, wherein each region corresponds to a different group of the plurality of groups and different groups are prioritized in real-time.

9. The method of claim 1, further comprising: performing the automatic response, using the device, in response to receiving a user input choosing to respond with the automatic response.

10. A system, comprising:
    a processor programmed to initiate executable operations comprising:
    determining a set of attributes associated with interactions between a user and a set of contacts, the set of attributes associated with the interactions related to the system;
    wherein the set of attributes includes ratios of incoming to outgoing calls between the user and the set of contacts;
    classifying the set of contacts into a plurality of groups by processing the set of attributes for the set of contacts through a plurality of ordered classification stages, wherein the plurality of groups are hierarchically ordered with at least one group of the plurality of groups being a subgroup of another group of the plurality of groups;
    associating an action rule with a selected group of the plurality of groups, wherein the action rule specifies a plurality of automatic responses performed by the system applied to communications received from contacts belonging to the selected group;
    a display screen coupled to the processor and configured to present the plurality of automatic responses as options in response to receiving a selected communication in the system from a contact belonging to the selected group and applying the action rule to the selected communication; and wherein the processor is further programmed to initiate executable operations comprising performing a particular automatic response from the plurality of automatic responses in response to receiving the selected communication from the contact in the selected group and receiving a user selection of the particular automatic response from the plurality of automatic responses presented as options.

11. The system of claim 10, wherein the set of attributes includes user reactions to incoming communications from the set of contacts, wherein the user reactions include operations initiated by the user on the system in response to the incoming communications.

12. The system of claim 10, wherein the set of attributes includes average duration of phone calls, the method further comprising:
   removing phone calls having a duration less than a minimum duration from use in determining the average duration of phone calls.

13. The system of claim 10, wherein the plurality of automatic responses are specific to the selected group.

14. The system of claim 10, wherein the set of attributes includes physical proximity between the set of contacts and the user for the interactions based upon location.

15. The system of claim 10, wherein the set of attributes includes a number of communication modalities the user uses to communicate with the set of contacts.

16. The system of claim 10, wherein the display screen is further configured to display an interface having a plurality of regions, wherein each region corresponds to a different group of the plurality of groups and, within each region, identifiers corresponding to selected contacts of the set of contacts are displayed with at least one of an order determined according closeness of the selected contacts to the user or are sized according to closeness of the selected contacts to the user.

17. A computer program product comprising a computer readable storage medium having program code stored thereon, the program code executable by a processor to initiate operations comprising:
   determining a set of attributes associated with interactions between a user and a set of contacts, the set of attributes associated with the interactions related to a device including the processor;
   wherein the set of attributes includes ratios of incoming to outgoing calls between the user and the set of contacts;
   classifying the set of contacts into a plurality of groups by processing the set of attributes for the set of contacts through a plurality of ordered classification stages, wherein the plurality of groups are hierarchically ordered with at least one group of the plurality of groups being a subgroup of another group of the plurality of groups;
   associating an action rule with a selected group of the plurality of groups, wherein the action rule specifies a plurality of automatic responses performed by the device applied to communications received from contacts belonging to the selected group;
   presenting, on a display screen of the device, the plurality of automatic responses as options in response to receiving a selected communication in the device from a contact belonging to the selected group and applying the action rule to the selected communication; and
   performing a particular automatic response from the plurality of automatic responses in response to the device receiving the selected communication from the contact in the selected group and receiving a user selection of the particular automatic response from the plurality of automatic responses presented as options.

18. The computer program product of claim 17, wherein the set of attributes includes a number of communication modalities the user uses to communicate with the set of contacts.

19. The computer program product of claim 17, wherein the plurality of automatic responses are specific to the selected group.

20. The computer program product of claim 17, wherein the program code is executable by the processor to initiate operations further comprising:
   displaying an interface having a plurality of regions, wherein each region corresponds to a different group of the plurality of groups and, within each region, identifiers corresponding to selected contacts of the set of contacts are displayed with at least one of an order determined according closeness of the selected contacts to the user or are sized according to closeness of the selected contacts to the user.

* * * * *